(12) United States Patent
LaJoie et al.

(10) Patent No.: US 8,161,071 B2
(45) Date of Patent: Apr. 17, 2012

(54) SYSTEMS AND METHODS FOR AUDIO ASSET STORAGE AND MANAGEMENT

(75) Inventors: Dan LaJoie, Santa Monica, CA (US); Marvin Carlberg, Los Angeles, CA (US); Akitaka Nishimura, Tokyo (JP)

(73) Assignee: United Video Properties, Inc., Santa Clara, CA (US)

( * ) Notice: Subject to any disclaimer, the term of this patent is extended or adjusted under 35 U.S.C. 154(b) by 281 days.

(21) Appl. No.: 12/570,110

(22) Filed: Sep. 30, 2009

(65) Prior Publication Data

US 2011/0078172 A1    Mar. 31, 2011

(51) Int. Cl.
*G06F 17/00* (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS

| | | |
|---|---|---|
| 3,919,479 A | 11/1975 | Moon et al. |
| 4,081,753 A | 3/1978 | Miller |
| 4,170,782 A | 10/1979 | Miller |
| 4,271,532 A | 6/1981 | Wine |
| 4,367,559 A | 1/1983 | Tults |
| 4,375,651 A | 3/1983 | Templin et al. |
| 4,381,522 A | 4/1983 | Lambert |
| 4,390,901 A | 6/1983 | Keiser |
| 4,425,579 A | 1/1984 | Merrell |
| 4,429,385 A | 1/1984 | Cichelli et al. |
| 4,495,654 A | 1/1985 | Deiss |
| 4,527,194 A | 7/1985 | Sirazi |
| 4,641,205 A | 2/1987 | Beyers, Jr. |
| 4,689,022 A | 8/1987 | Peers et al. |
| 4,706,121 A | 11/1987 | Young |
| 4,754,326 A | 6/1988 | Kram et al. |
| 4,908,713 A | 3/1990 | Levine |
| 4,963,994 A | 10/1990 | Levine |
| 5,038,211 A | 8/1991 | Hallenbeck |
| 5,047,867 A | 9/1991 | Strubbe et al. |
| 5,075,771 A | 12/1991 | Hashimoto |
| 5,210,611 A | 5/1993 | Yee et al. |
| 5,223,924 A | 6/1993 | Strubbe |
| 5,317,403 A | 5/1994 | Keenan |

(Continued)

FOREIGN PATENT DOCUMENTS

EP    0 721 253    7/1996

(Continued)

OTHER PUBLICATIONS

Sonic Foundry, Inc., Sound Forge 6.0 User Manual, 2002. http://www.sonycreativesoftware.com/download/manuals/soundforgefamily.

(Continued)

*Primary Examiner* — Isaac M Woo
(74) *Attorney, Agent, or Firm* — Ropes & Gray LLP

(57) ABSTRACT

Systems and methods for providing audio asset information using an audio asset information storage system are provided. The storage system includes a data store containing video program information associated with a video program that embeds the known audio asset. The storage system receives a number of requests to identify the known audio asset and stores an indication of each request within the data store. The storage system provides at least a portion of audio asset information associated with the known audio asset to user equipment.

18 Claims, 13 Drawing Sheets

U.S. PATENT DOCUMENTS

| | | | |
|---|---|---|---|
| 5,323,240 | A | 6/1994 | Armano et al. |
| 5,404,393 | A | 4/1995 | Remillard |
| 5,410,344 | A | 4/1995 | Graves et al. |
| 5,444,499 | A | 8/1995 | Saitoh |
| 5,465,113 | A | 11/1995 | Gilboy |
| 5,465,385 | A | 11/1995 | Ohga et al. |
| 5,477,262 | A | 12/1995 | Banker et al. |
| 5,479,268 | A | 12/1995 | Young et al. |
| 5,481,296 | A | 1/1996 | Cragun et al. |
| 5,483,278 | A | 1/1996 | Strubbe et al. |
| 5,534,911 | A | 7/1996 | Levitan |
| 5,585,838 | A | 12/1996 | Lawler et al. |
| 5,585,865 | A | 12/1996 | Amano et al. |
| 5,585,866 | A | 12/1996 | Miller et al. |
| 5,589,892 | A | 12/1996 | Knee et al. |
| 5,594,509 | A | 1/1997 | Florin et al. |
| 5,600,364 | A | 2/1997 | Hendricks et al. |
| 5,600,573 | A | 2/1997 | Hendricks et al. |
| 5,617,565 | A | 4/1997 | Augenbraun et al. |
| 5,621,456 | A | 4/1997 | Florin et al. |
| 5,635,978 | A | 6/1997 | Alten et al. |
| 5,635,989 | A | 6/1997 | Rothmuller |
| 5,694,176 | A | 12/1997 | Bruette et al. |
| 5,731,844 | A | 3/1998 | Rauch et al. |
| 5,752,160 | A | 5/1998 | Dunn |
| 5,774,357 | A | 6/1998 | Hoffberg et al. |
| 5,798,785 | A | 8/1998 | Hendricks et al. |
| 5,801,747 | A | 9/1998 | Bedard |
| 5,822,123 | A | 10/1998 | Davis et al. |
| 5,848,396 | A | 12/1998 | Gerace |
| 5,867,226 | A | 2/1999 | Wehmeyer |
| 5,875,108 | A | 2/1999 | Hoffberg et al. |
| 5,880,768 | A | 3/1999 | Lemmons et al. |
| 5,903,545 | A | 5/1999 | Sabourin et al. |
| 5,907,323 | A | 5/1999 | Lawler et al. |
| 5,973,683 | A | 10/1999 | Cragun et al. |
| 5,977,964 | A | 11/1999 | Williams et al. |
| 6,005,597 | A | 12/1999 | Barrett et al. |
| 6,029,195 | A | 2/2000 | Herz |
| 6,075,526 | A | 6/2000 | Rothmuller |
| 6,081,750 | A | 6/2000 | Hoffberg et al. |
| 6,088,722 | A | 7/2000 | Herz et al. |
| 6,133,909 | A | 10/2000 | Schein et al. |
| 6,141,488 | A | 10/2000 | Knudson et al. |
| 6,163,316 | A | 12/2000 | Killian |
| 6,172,674 | B1 | 1/2001 | Etheredge |
| 6,177,931 | B1 | 1/2001 | Alexander et al. |
| 6,181,335 | B1 | 1/2001 | Hendricks et al. |
| 6,216,264 | B1 | 4/2001 | Maze et al. |
| 6,437,836 | B1 | 8/2002 | Huang et al. |
| 6,469,753 | B1 | 10/2002 | Klosterman et al. |
| 6,505,348 | B1 | 1/2003 | Knowles et al. |
| 6,728,713 | B1 | 4/2004 | Beach et al. |
| 6,748,360 | B2 | 6/2004 | Pitman et al. |
| 6,834,308 | B1 | 12/2004 | Ikezoye et al. |
| 6,925,489 | B1 | 8/2005 | Curtin |
| 6,941,275 | B1 | 9/2005 | Swierczek |
| 7,058,376 | B2 | 6/2006 | Logan et al. |
| 7,242,856 | B2 | 7/2007 | Ishida et al. |
| 7,392,532 | B2 | 6/2008 | White et al. |
| 7,634,796 | B2 * | 12/2009 | Son et al. .................. 725/86 |
| 2002/0040475 | A1 | 4/2002 | Yap et al. |
| 2002/0056118 | A1 | 5/2002 | Hunter et al. |
| 2002/0069252 | A1 | 6/2002 | Jones et al. |
| 2002/0069418 | A1 | 6/2002 | Philips |
| 2002/0198789 | A1 | 12/2002 | Waldman |
| 2003/0093790 | A1 | 5/2003 | Logan et al. |
| 2003/0149988 | A1 | 8/2003 | Ellis et al. |
| 2004/0095516 | A1 | 5/2004 | Rohlicek |
| 2004/0103434 | A1 | 5/2004 | Ellis |
| 2004/0199387 | A1 | 10/2004 | Wang et al. |
| 2006/0095323 | A1 | 5/2006 | Muranami |
| 2006/0242665 | A1 | 10/2006 | Knee et al. |
| 2009/0013348 | A1 | 1/2009 | Thomas et al. |

FOREIGN PATENT DOCUMENTS

| | | |
|---|---|---|
| EP | 0 774 866 | 5/1997 |
| EP | 0 848 383 | 6/1998 |
| EP | 0 854 645 | 7/1998 |
| EP | 0 936 774 | 8/1999 |
| EP | 1 087 619 | 3/2001 |
| EP | 1 126 643 | 8/2001 |
| GB | 1 554 411 | 10/1979 |
| WO | WO 86/01359 | 2/1986 |
| WO | WO 89/03085 | 4/1989 |
| WO | WO 94/13107 | 6/1994 |
| WO | WO 94/14284 | 6/1994 |
| WO | WO 95/28799 | 10/1995 |
| WO | WO 95/32583 | 11/1995 |
| WO | WO 96/17473 | 6/1996 |
| WO | WO 96/31980 | 10/1996 |
| WO | WO 96/41478 | 12/1996 |
| WO | WO 97/42763 | 11/1997 |
| WO | WO 97/48230 | 12/1997 |
| WO | WO 98/26584 | 6/1998 |
| WO | WO 98/43183 | 10/1998 |
| WO | WO 98/48566 | 10/1998 |
| WO | WO 99/01984 | 1/1999 |
| WO | WO 99/14947 | 3/1999 |
| WO | WO 99/45701 | 9/1999 |
| WO | WO 99/45702 | 9/1999 |
| WO | WO 00/04708 | 1/2000 |
| WO | WO 00/05889 | 2/2000 |
| WO | WO 00/13415 | 3/2000 |
| WO | WO 00/28734 | 5/2000 |
| WO | WO 00/33573 | 6/2000 |
| WO | WO 01/01677 | 1/2001 |
| WO | WO 02/11123 | 2/2002 |
| WO | WO 02/27600 | 4/2002 |
| WO | WO 02/078317 | 10/2002 |
| WO | WO 03/007235 | 1/2003 |
| WO | WO 03/036541 | 5/2003 |
| WO | WO 2004/090752 | 10/2004 |
| WO | WO 2005/029843 | 3/2005 |

OTHER PUBLICATIONS

Reynolds, K.Y. et al., "Multiplexing and Demultiplexing Digital Audio and Video in Today's Digital Environment," SMPTE Journal, vol. 102, No. 10, pp. 905-909, Oct. 1993.

iPod.iTunes ReadMe, Readme Files Apple, Aug. 13, 2003.

Chen, C.W. et al., "Content Identification in Consumer Applications", Multimedia and Expo, 209, ICME 2009, IEEE Jun. 28, 2009, pp. 1536-1539.

Fink, M., et al., "Mass personalization: social and interactive applications using sound-track identification", Multimedia Tools and Applications, vol. 36, No. 1-2, Dec. 21, 2006, pp. 115-132.

Shazam, "Music Explorer", Mar. 18, 2009, pp. 1-2, retrieved from the internet May 10, 2011.

* cited by examiner

SYSTEMS AND METHODS FOR AUDIO ASSET STORAGE AND MANAGEMENT

BACKGROUND OF THE INVENTION

This invention relates generally to interactive media guidance applications, and more particularly, to systems and methods for managing and identifying audio content using an interactive media guidance application.

With the increasing use of interactive program guides and other media guidance applications, advanced media guidance application support for media content other than traditional television programming is becoming more important. Specifically, media guidance features directed toward the management of audio content is becoming highly desirable. At the same time, a convergence of media storage systems is driving the need for media guidance applications to manage and exploit the relationships between different kinds of media content, such as between video and audio.

In conventional interactive television application systems, there is no convenient method for retrieving information about an audio asset embedded within a video program. In particular, there may be times when a user desires to view information identifying an audio asset while viewing a video program. For example, a user may hear a song played in a video program and wish to identify or purchase the song.

Accordingly, it would be desirable to have a systematic approach for managing and identifying audio content within a media guidance application.

SUMMARY OF THE INVENTION

In view of the foregoing, systems and methods for managing and identifying video embedded audio content using an interactive media guidance application are provided.

In one approach, an audio asset information storage system includes a data store containing audio asset information associated with a known audio asset. The audio asset information includes video program information associated with a video program that embeds the known audio asset. The audio asset information storage system also includes a processor capable of i) receiving a number of requests to identify the known audio asset, ii) storing an indication of each request within the data store, and iii) providing at least a portion of the audio asset information associated with the known audio asset to user equipment.

That audio asset information may include an audio asset signature, identifier, title, artist, album, album art, genre, type, lyrics, and/or play time. The video program information may include a program title, genre, type, episode, series, broadcast schedule, audio asset location, audio asset start time, audio asset end time, audio asset play time, song lyrics, audio text, and/or audio asset quality.

In one embodiment, the data store is located remotely from the user equipment, and the storage system is further capable of i) monitoring a set of user equipment data stores, ii) identifying audio asset information stored in the remote data store that is not stored in the set of user equipment data stores, and iii) providing the identified audio asset information to the set of user equipment data stores.

In another embodiment, at least a portion of the audio asset information is provided in response to determining that the user equipment is set (or has previously been set) to display or record the video program that embeds the known audio asset. Alternatively, at least a portion of the audio asset information is provided in response to determining that a user profile at the user equipment includes audio preference data matching characteristics of the known audio asset. The characteristics of the known audio asset may be included in the audio asset information. As another alternative, at least a portion of the audio asset information is provided in response to determining that a user profile at the user equipment includes video preference data matching characteristics of the video program that embeds the known audio asset. The characteristics of the video program may be included in the video program information.

In an embodiment, the storage system is capable of i) receiving a request to view all audio assets associated with a selected video program, ii) searching the data store for audio assets associated with video program information identifying the selected video program, and iii) providing at least a portion of the audio asset information associated with each of the matching audio assets to the user equipment.

In another embodiment, the storage system is capable of i) determining that a threshold number of requests to identify the known audio asset have been received, and ii) storing an indication of the threshold determination within the audio asset information associated with the known audio asset. At least a portion of the audio asset information may be provided in response to the threshold determination.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF EMBODIMENTS

Figure 1:
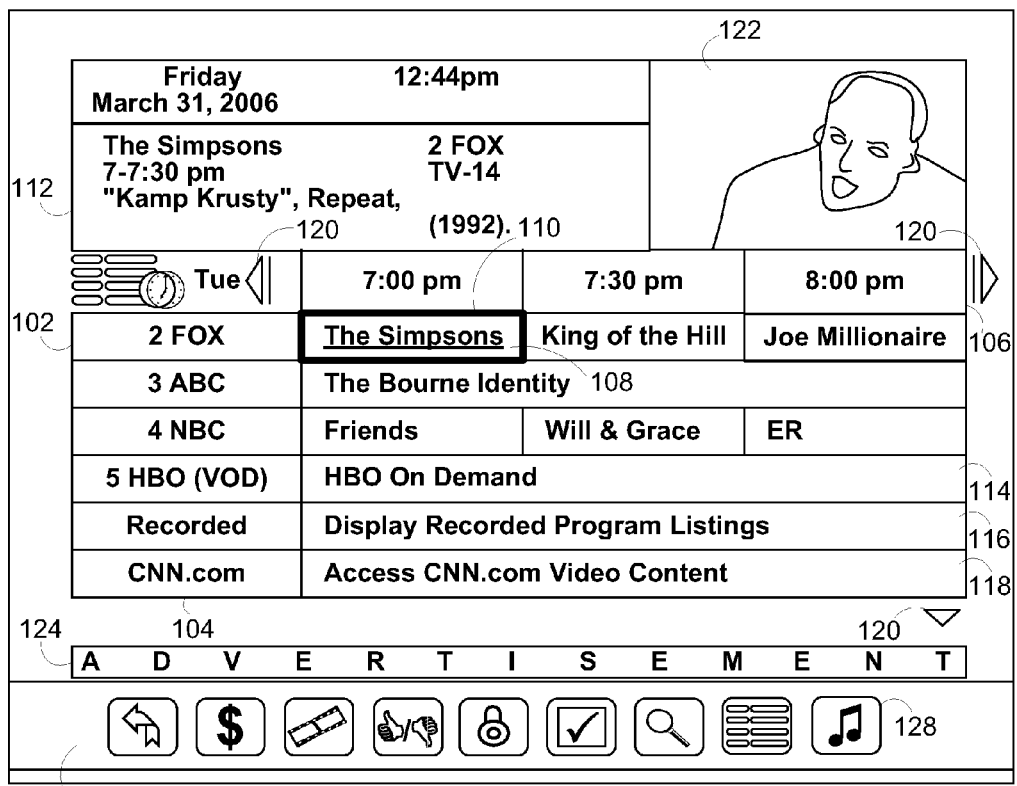
FIG. 1 shows a display screen using a grid format that may be used to provide guidance for various types of media according to an illustrative embodiment of the invention.

The amount of media available to users in any given media delivery system may be substantial. Consequently, many users desire a form of media guidance through an interface that allows users to efficiently navigate through media selections and easily identify media content that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), recorded programs, and other types of media or video content. Guidance applications also allow users to navigate among and locate content related to the video content including, for example, video clips, audio assets, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but may also be part of a live performance. It should be understood that the invention embodiments that are described in relation to media or media content are also applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

Figure 2:
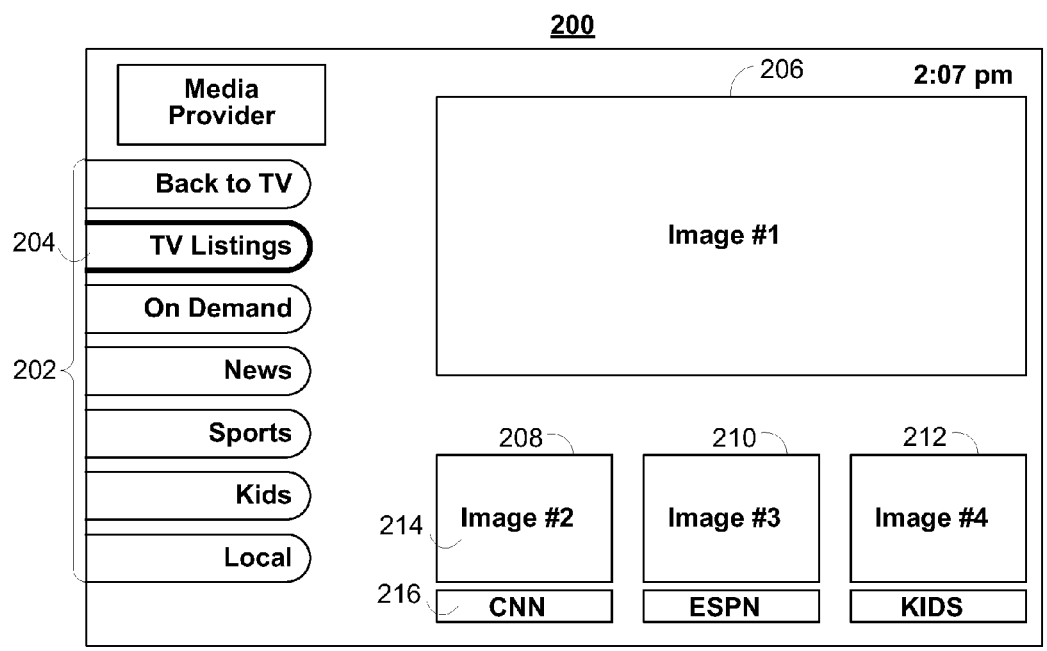
FIG. 2 shows a display screen using a mosaic that may be used to provide guidance for various types of media according to an illustrative embodiment of the invention.

One of the functions of the media guidance application is to provide media listings and media information to users. FIGS. 1 and 2 show illustrative display screens that may be used to provide media guidance, and in particular media listings. The display screens shown in FIGS. 1 and 2 may be implemented on any suitable device or platform. As defined herein, platform refers to any system that may support the operation of an interactive media guidance application. While the displays of FIGS. 1 and 2 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user may select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video or audio content stored on a digital video recorder (DVR), digital video disc (DVD), video cassette, compact disc (CD), hard drive, or other storage device), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120).

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be an advertisement for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display screen or embedded within a display screen. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. For example, selectable option 128 may allow the user to access an audio library, which is described in greater detail below in connection with FIG. 6. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, identifying audio assets embedded in a program, configuring audio identification settings, or other features. Options available from a main menu display may include search options, VOD options, parental control options, audio identification options, access to various types of listing displays, subscribe to a premium service, edit a user's profile, access a browse overlay, access an audio library, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile, which may be customized for each user who will be interacting with the media guidance application. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the media guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user may be provided with a unified guidance application experience across the user's different devices. This type of user experience is described in greater detail below in connection with FIG. 5. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one region, including media region 214 and text region 216. Media region 214 and/or text region 216 may be selectable to view video in full-screen or to view program listings related to the video displayed in media region 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
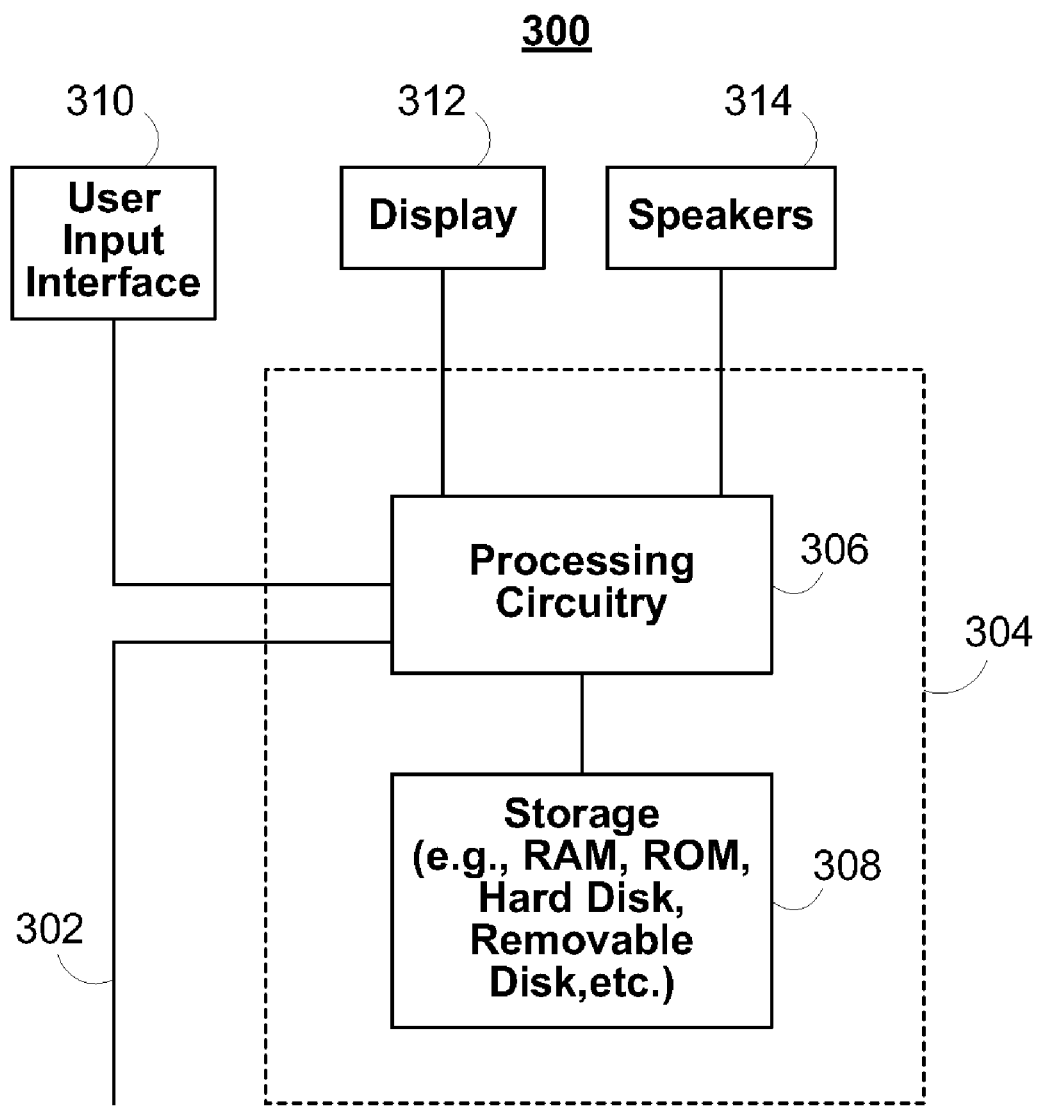
FIG. 3 shows a user equipment device according to an illustrative embodiment of the invention.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 5. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include audio processing and extraction circuitry, which is discussed in greater detail below in connection with FIG. 9. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, audio processing, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, microphone, auxiliary line input, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos, stored or streaming audio content, and other media content displayed on display 312 may be played through speakers 314. In some embodiments, the audio may be distributed to a receiver (not shown), which processes and outputs the audio via speakers 314. As used herein, speakers 314 are illustrative of, and may represent, any type of audio output device (e.g., headphones, a wireless headset, an audio output auxiliary port, etc.).

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In yet other embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
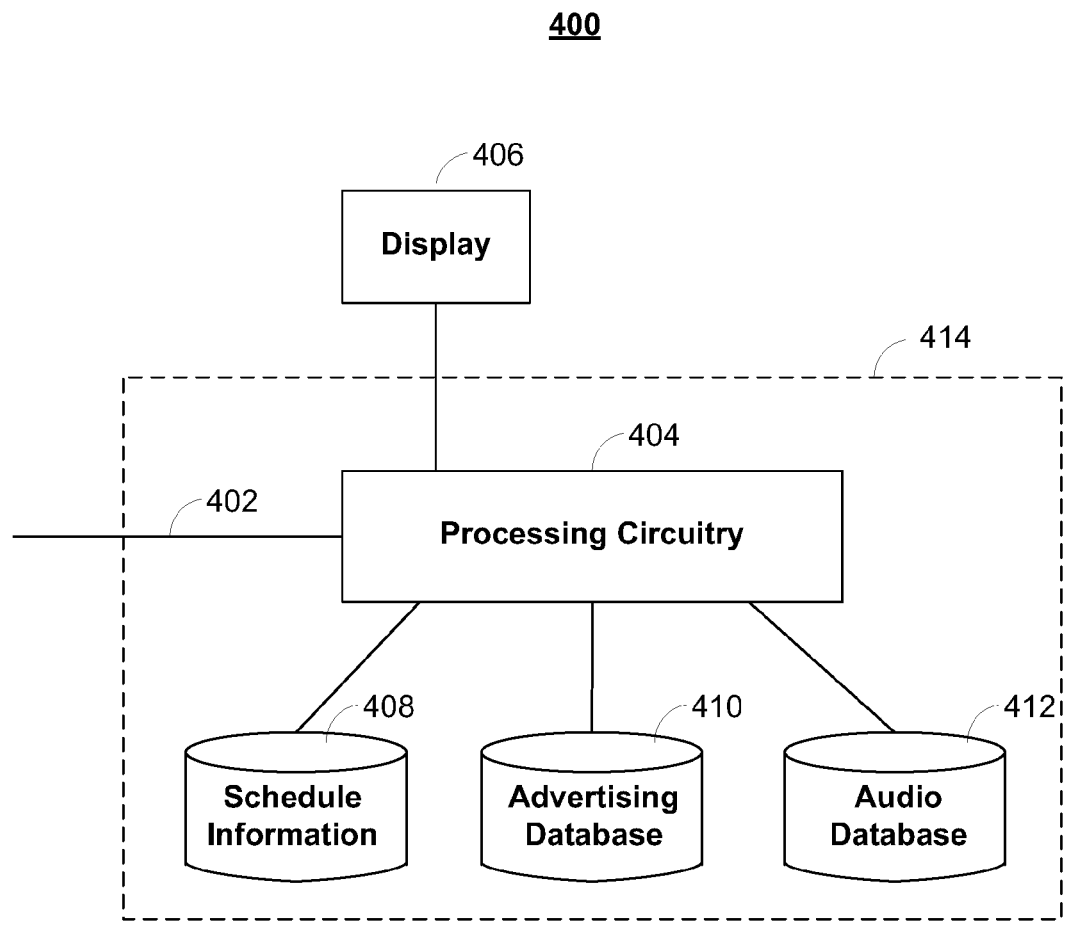
FIG. 4 shows a simplified diagram of an illustrative interactive media system according to an illustrative embodiment of the invention.

Referring now to FIG. 4, illustrative user equipment device 400 is shown in accordance with an embodiment of the present invention. User equipment device 400 is a more detailed, yet still simplified, view of user equipment device 300 of FIG. 3. In addition to the features and functionalities described below, user equipment device 400 may include any of the components, features, and functionalities described above in connection with FIG. 3. Control circuitry 414 of user equipment device 400 may include processing circuitry 404, schedule information data store 408, advertising data store 410, and audio data store 412. Data stores 408, 410, and 412 may each be one or more relational databases or any other suitable storage mechanisms. Although data stores 408, 410, and 412 are shown as separate data stores, one or more of these data stores may instead be combined into a single storage system. Although only data stores 408, 410, and 412 are shown in FIG. 4, it will be understood that there may be any suitable number of data stores.

Schedule information data store 408 may store media guidance data for a media guidance application. Schedule information data store 408 may store media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), on-demand information, or any other suitable information. The schedule information included in schedule information data store 408 may be used by the media guidance application to provide a program guide display (e.g., display screens 100 and 200 of FIGS. 1 and 2, respectively) on display 406, or to provide any other suitable media guidance display.

With continuing reference to FIG. 4, advertising data store 410 may store advertising content for display in a media guidance application. Advertising data store 410 may store advertising content in various forms, including text, graphics, images, video clips, content of any other suitable type, or references to remotely stored content. Data store 410 may also store links or identifiers to advertising content in other data stores. In some embodiments, data store 410 may store indexes for advertising content in other local data stores (e.g., data store 408 or 412), or may store identifiers to remote storage systems, such as URLs to advertisements provided by web servers. Data store 410 may also store identifying information about each advertisement or advertisement element (e.g., associated advertiser, type of promotional, length of promotion, a television show, product, or service the advertisement is promoting, etc.), or may store indexes to locations in other local or remote storage systems where this information may be found.

With continuing reference to FIG. 4, audio data store 412 may store audio assets or information related to audio assets accessible through a media guidance application. Audio assets, as used herein, refers to any type of audio content including songs, dialogue, narration, background music, sound effects, etc. The audio assets may be distinct analog or digital objects (e.g., digital files) or may be embedded within other media or signals. In particular, an audio asset may be embedded in a video program, for example, as part of an audio track. A video program, or other media content, may embed or be associated with one or more audio tracks or audio signals. The audio tracks or audio signals may, in turn, contain one or more audio assets. Moreover, an audio asset itself may include a number of other audio assets. For example, a song may include voice-over narration and background music, each of which are audio assets in their own right. User or system requests to identify an audio asset (described below) may therefore result in the identification of multiple audio assets. For example, a user request to identify a song including voice-over narration and background music may result in identification of the song, the voice-over narration, and/or the background music.

Audio data store 412 may store audio assets or information about audio assets locally recorded or extracted (e.g., audio assets recorded using a DVR, CD recorder, DVD recorder, etc. or extracted from a CD, DVD, a video program, etc.) or available remotely (e.g., audio assets stored on a remote server and available through download, streaming, etc.). Audio data store 412 may also store audio assets or information about audio assets embedded within video content (e.g., audio assets embedded within a television program, a locally stored or remotely available video program, etc.). The contents of audio data store 412 may include audio assets such as songs, dialogue, narration, background music, etc., or metadata associated with such audio content. In addition, audio data store 412 may include information related to audio assets including text, graphics, images, video clips, content of any other suitable type, or references to remotely stored content. Audio data store 412 may also store links or identifiers to media content in other data stores. In some embodiments, audio data store 412 may store indexes for media content in other local data stores (e.g., data store 408 or 410), or may store identifiers to remote storage systems, such as URLs to media provided by web servers.

Audio data store 412 may also store identifying information associated with audio assets. For example, audio data store 412 may include the type, format, title, artist, composer, producer, author, description, genre, category, album, cover art, production dates, or other identifying information associated with the audio assets. As another example, audio data store 412 may include information related to a television program, logo, advertiser, advertisement, product, or service with which the audio is associated, or any other suitable information. Audio data store 412 may also (or alternatively) store indexes to locations in other local or remote storage systems where this information may be found.

With continuing reference to FIG. 4, processing circuitry 404, which may have any of the features and functionalities of processing circuitry 306 (FIG. 3), may access any of the information included in data stores 408, 410 and 412. Processing circuitry 404 may use this information to select, prepare, and display information on display 406. In particular, processing circuitry 404 may use information obtained from these data stores to provide a media guidance application with advertisements to a user of user equipment 400. For example, processing circuitry 404 may use this information to display audio library display screen 600 of FIG. 6. Processing circuitry 404 may also use the information included in data stores 408, 410, and 412 to select, prepare, and output audio to speakers 314 of FIG. 3. In addition, processing circuitry 404 may update information in data stores 408, 410 and 412 with data received from, for example, communications link 402. Communications link 402 may have any of the features and functionalities of communications links 508, 510, and 512 of FIG. 5, discussed in greater detail below. In some embodiments, processing circuitry 404 may update schedule information in data store 408 with new or updated information, may add, remove, or change any advertising content in data store 410, and may add, remove, or change audio content or information associated with audio content in data store 412 or any other suitable data store. Processing circuitry 404 may additionally update any of the associations between these data stores (e.g., between a scheduled broadcast and its associated advertisement, between a video program and its embedded audio assets, etc.).

Figure 5:
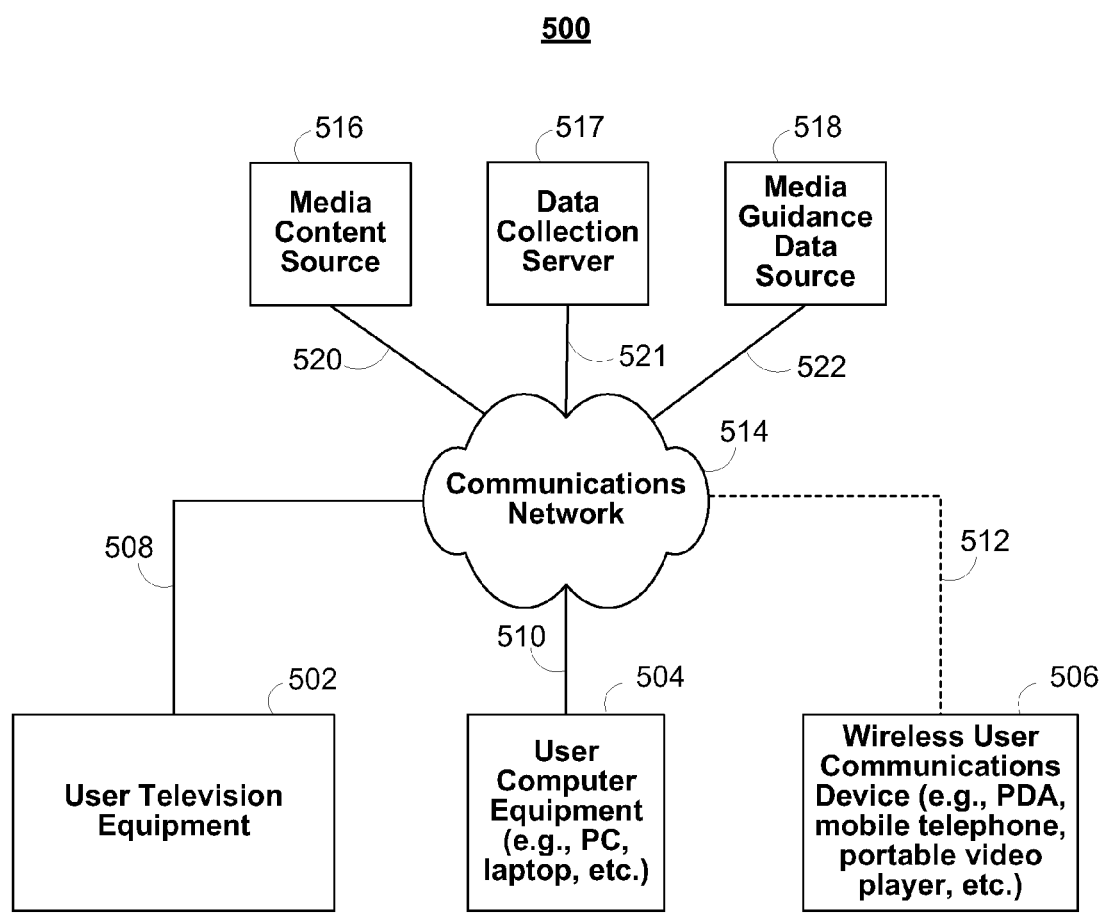
FIG. 5 shows a diagram of a cross-platform interactive media system according to an illustrative embodiment of the invention.

Referring now to FIG. 5, illustrative system 500 is shown for providing media guidance to different types of user equipment devices in accordance with an embodiment of the present invention. User equipment devices 300 and 400 of FIGS. 3 and 4, respectively, may be implemented in system 500 of FIG. 5 as user television equipment 502, user computer equipment 504, wireless user communications device 506, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 502 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 504 may include a PC, a laptop, a tablet, a WebTV box, a personal computer television (PC/TV), a PC media server, a PC media center, or other user computer equipment. WEBTV is a trademark owned by Microsoft Corp. Wireless user communications device 506 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 502, user computer equipment 504, and wireless user communications device 506 may utilize at least some of the system features described above in connection with FIG. 3 and, as a result, include flexibility with respect to the type of media content available on the device. For example, user television equipment 502 may be Internet-enabled allowing for access to Internet content, while user computer equipment 504 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 500, there is typically more than one of each type of user equipment device but only one of each is shown in FIG. 5 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device may change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes media content source 516, data collection server 517, and media guidance data source 518 coupled to communications network 514 via communication paths 520, 521, and 522, respectively. Paths 520, 521, and 522 may include any of the communication paths described above in connection with paths 508, 510, and 512. Communications with the media content source 516, data collection server 517, and media guidance data source 518 may be exchanged over one or more communications paths, but are shown as a single path in FIG. 5 to avoid overcomplicating the drawing. In addition, there may be more than one of each of media content source 516, data collection server 517, and media guidance data source 518, but only one of each is shown in FIG. 5 to avoid overcomplicating the drawing. (The different types of each of these sources are discussed below.) If desired, media content source 516, data collection server 517, and media guidance data source 518 may be integrated as one source device. Although communications between sources 516, 517, and 518 with user equipment devices 502, 504, and 506 are shown as through communications network 514, in some embodiments, sources 516, 517, and 518 may communicate directly with user equipment devices 502, 504, and 506 via communication paths (not shown) such as those described above in connection with paths 508, 510, and 512.

Media content source 516 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 516 may be the originator of media content (e.g., a television broadcaster, a Webcast provider, etc.) or may not be the originator of media content (e.g., an on-demand media content provider, an Internet provider of video content of broadcast programs for downloading, etc.). Media content source 516 may include cable sources, satellite providers, on-demand providers, Internet providers, or other providers of media content. Media content source 516 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Data collection server 517 may receive data from user equipment devices 502, 504, and 506. This data may include data sent to media content source 516 or media guidance data source 518. The data may also include requests or queries initiated from user equipment (e.g., devices 502, 504, and 506) and responses to requests or queries initiated from server equipment (e.g., sources 516, 517, and 518). In addition, data collection server 517 may receive monitoring data gathered by a media guidance application implemented on user equipment devices 502, 504, and 506. For example, user interaction with the media guidance application may be monitored, compiled into a data set, and sent to data collection server 517. Monitoring data may include user viewing habits (e.g., which programs a user views or records, and when the user views or records the programs), user interaction with advertisements (e.g., which advertisements a user selects, and when a user selects the advertisement), user purchasing habits (e.g., what types of products or services a user orders, and when the orders are placed), user audio preferences (e.g., what audio content or what types of audio content a user records, purchases, or selects for identification), and other suitable information. Monitoring using interactions in a media guidance application is discussed in more detail in Alexander et al. U.S. patent application Ser. No. 09/120,488, filed Jul. 21, 1998, which is hereby incorporated by reference herein in its entirety.

Data collection server 517 may collect and correlate data received from multiple users to determine commonalities between users, prevalent behavior patterns, and popular features, queries, and preferences. For example, data collection server 517 may compile the audio preferences of a number of users to determine the most popular artists, genres, songs, etc. As another example, data collection server 517 may compile monitoring data of user interaction with the media guidance application to determine the most frequently accessed features, options, and display screens. In addition, data collection server 517 may compile monitoring data to determine the most effective advertisements and advertisement placement (e.g., location and timing). Data collection server 517 may use these determinations and other analyses of user generated data to provide updated features and new services to other users. For example, based on a determination of popular video programs, data collection server 517, or sources 516 or 518, may provide advertisements or alerts to other users about future broadcasts or delivery options for the popular programs. As another example, the media guidance application may collect information on audio asset identification requests from a plurality of users, determine audio assets that are frequently the subject of such requests, and provide audio asset information to other users automatically. Audio asset identification, requests for audio asset identification, and automatic transmission of audio asset information are all described in further detail below.

Media guidance data source 518 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance data source 518 may additionally provide advertisement information (e.g., text, images, media clips, etc.) to the user equipment devices. The advertisement information may include any advertisements used by the media guidance application to provide advertisements to a user. The advertising information provided to the user devices may have originated from any suitable source, which may or may not be media guidance data source 518. In some embodiments, the advertising information may have originated from various different advertisers or program sponsors, and may have originated from media content source 516 or data collection server 517.

Media guidance application data, including advertisement information and audio asset information, may be provided to the user equipment devices using any suitable approach or combination of approaches. In some embodiments, the guidance application may be a stand-alone interactive television program guide that receives program guide data via a data feed (e.g., a continuous feed, trickle feed, or data in the vertical blanking interval of a channel). Program schedule data and other guidance data, such as advertising information or audio asset information, may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media content source 516, data collection server 517, or media guidance data source 518 may be provided to users' equipment using a client-server approach. For example, a guidance application client residing on the user's equipment may initiate sessions with source 518 to obtain guidance data when needed. Media guidance data source 518 may provide user equipment devices 502, 504, and 506 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 (FIG. 3) and partially on a remote server as a server application (e.g., media guidance data source 518). The guidance application displays may be generated by media content source 516, data collection server 517, media guidance data source 518, or a combination of these sources and transmitted to the user equipment devices. Sources 516, 517, and 518 may also transmit data for storage on the user equipment, which then generates the guidance application displays based on instructions processed by control circuitry.

Referring again to FIG. 5, media guidance system 500 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 5.

In one approach, user equipment devices may communicate with each other within a home network. User equipment devices may communicate with each other directly via short-range point-to-point communication schemes describe above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home may use their media guidance application to communicate directly with media content source 516 to access media content. Specifically, within a home, users of user television equipment 504 and user computer equipment 506 may access the media guidance application to navigate among and locate desirable media content. Users may also access the media guidance application outside of the home using wireless user communications devices 506 to navigate among and locate desirable media content.

Figure 6:
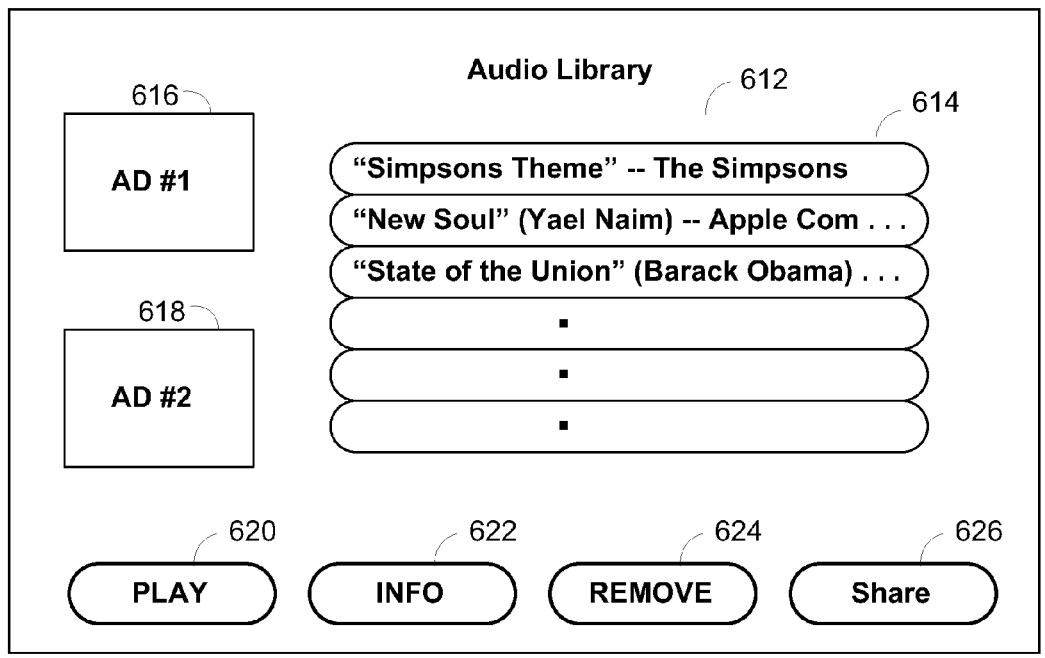
FIG. 6 shows a display screen of an audio library interface according to an illustrative embodiment of the invention.

Referring to FIG. 6, an audio library display screen 600 is provided in accordance with an embodiment of the present invention. Audio library display screen 600 is displayed when the user accesses a list of audio assets, for example, by selecting selectable option 128 of options region 126 (FIG. 1) or a dedicated button on a remote control. Audio asset list 612 in audio library display screen 600 contains listings of songs or other audio content that the user selected to identify, purchase, record, or save. Audio asset list 612 may also contain listings of audio content that has been downloaded, transferred, or stored to the user's equipment (e.g., storage 308 of FIG. 3) or one or more remote storage locations. In addition, listings of audio content and related information displayed in audio asset list 612 may be stored in audio data store 412 of FIG. 4 and may be processed for display on display 406 or for output to speakers 314 of FIG. 3 by processing circuitry 404 of FIG. 4.

The listings displayed in audio asset list 612 may contain text, images, video, or any combination thereof. In particular, the listings may contain information identifying audio assets. This identifying information may include any of the information stored in audio data store 412, or any other data stores (e.g., data stores 408 and 410). In addition, the identifying information may be retrieved remotely, or may be extracted from metadata transmitted with, or separately from, a video or audio program. The identifying information may include, for example, the type, format, title, artist, composer, producer, author, description, genre, category, abum, cover art, production dates, or other identifying information associated with the audio asset. The listings displayed in audio asset list 612 may also contain information related to a television program, logo, advertiser, advertisement, product, or service with which the audio assets are associated, or any other suitable information. In cases of audio assets embedded within video, audio assets identified, selected, or purchased while watching video, or audio assets otherwise linked to video content, the listings displayed in audio asset list 612 may contain information related to the associated video content. Information related to associated video may include information such as the video type, format, genre, category, title, episode, series, channel, description, broadcast date and time, relative timing of the audio within the video, sponsor, etc. For example, listing 614 may provide title information of a stored song (e.g., "Simpsons Theme"), and title information of the television program within which the song was embedded (e.g., The Simpsons). Listing 614 may have been added, for example, during the broadcast of an episode of The Simpsons, in response to a user request for the song to be identified, purchased, recorded, or saved.

The listings displayed in audio asset list 612 may also contain information related to the context and conditions under which the audio assets were identified, purchased, stored, selected, provided, or otherwise added to the audio library. For example, a timestamp may be displayed indicating the date and time of a user request that caused an audio asset to be identified, purchased, stored, selected, provided, or otherwise added to the audio library. As another example, in embodiments in which multiple users may access the media guidance application, an indication of the identity of the user that caused an audio asset to be added to the audio library may be provided. As yet another example, a listing may display information indicating whether the corresponding audio asset was added by a user, by the media guidance application, or by another entity. Instead of, or in addition to, text, images, or video data, any or all of the aforementioned information may be represented within a listing using any suitable display method, such as highlighting, shading, flashing, etc. For example, listings of automatically added audio assets may have a background color different than those of user added audio assets. The information displayed in the listings of audio asset list 612, and the display properties of the listings, may be configured by the user using the media guidance application.

The media guidance application may automatically add, delete, or modify the listings in audio asset list 612. For example, a sponsor, the media guidance application provider, a broadcaster, or another suitable entity may provide free audio assets or may reward a user with audio assets. This audio content may be automatically added to the audio library, or the user may be prompted to accept or reject the audio content. As another example, the media guidance application may determine audio assets related to other audio assets in the user's audio library and may provide listings of recommended audio assets, or clips of recommended audio assets, within audio asset list 612. In some embodiments, audio assets or audio clips are available for only a certain period of time, and the media guidance application may remove listings corresponding to expired audio content. Similarly, listings associated with audio assets no longer accessible (e.g., audio assets stored in an inaccessible storage device) may be removed automatically, or upon user request, from audio asset list 612. In addition, in response to user input, or in response to information received by the media guidance application from a remote server or database, the contents of the listings of audio asset list 612 may be updated. For example, the user may edit the text displayed in a listing to add, delete, or modify the displayed information. Modifications made to the listings of audio asset list 612 may be stored in an appropriate data store (e.g., audio data store 412 of FIG. 4) or provided to a remote server (e.g. data collection server 517 of FIG. 5).

The listings of audio asset list 612 may be browsed, highlighted, selected, or otherwise engaged by a user using a user input device. For example, a user may move a highlight region or cursor over a listing to activate the listing. In some embodiments, the media guidance application is responsive to a cursor or highlight region placed over a listing of audio asset list 612. For example, the media guidance application may update advertisements 616 and 618 based on the location of the cursor or highlight region (e.g., the advertisements may be related to the audio asset associated with the listing currently highlighted). The media guidance application may also perform additional functions upon selection of a highlighted or otherwise engaged listing. For example, selecting a listing may cause the media guidance application to display additional information related to the audio asset associated with the selected listing. A user may use navigation buttons of a remote control or other user input device to control the location of the highlight region or cursor. In addition, specialized or programmed buttons may be used to trigger various functions related to the listings of audio asset list 612. For example, a "Play" button may play the audio asset associated with a highlighted or engaged listing while an "Enter" button may retrieve additional information, such as purchasing information.

The user may use any type of input device to navigate among the listings of audio asset list 612. A user may navigate above or below the displayed listings to display additional listings, if available. In addition, a user may navigate to advertisements 616 and 618 to highlight, engage, activate, select, or otherwise interact with the advertisements. For example, a user may highlight or engage an advertisement and, using a button on the user input device or by selecting a displayed option, may request a new advertisement to be displayed. This feature may be advantageous, for example, when advertisements 616 or 618 display audio asset recommendations to the user (e.g., based on the last listing highlighted or activated, or based on a determination of the user's tastes or preferences). In this case, a user may request a different advertisement in order to see additional recommendations. In some embodiments, the advertisements displayed in audio library display screen 600 automatically changes periodically to show, for example, different audio asset recommendations to a user.

In some embodiments, the media guidance application plays an audio asset corresponding to a listing of audio asset list 612 in response to a user selection of, or interaction with, the listing. For example, the media guidance application may play a sample or a clip of the audio asset associated with a listing when the listing is highlighted or activated. In other embodiments, a user can select a listing of audio asset list 612 to retrieve additional information or options related to the corresponding audio asset. Additional information displayed in response to a user selection may include any of the information that may be displayed within a listing. For example, due to display constraints, a listing may only have room to display audio asset title information; selection of the listing may allow the user to view or edit additional information such as artist name, album title, and associated video program information. The additional information may be provided on a separate display screen or may be displayed in an overlay over audio library display screen 600. Options provided in response to a user selection of a listing of audio asset list 612 may include playing (e.g., option 620), deleting (e.g., option 624), purchasing, transferring, or sharing (e.g., option 626) the audio. Options may also be provided to allow the user to edit audio asset information, configure the listing display properties (e.g., background color, text color, shading, etc.), access additional information related to the audio asset (e.g., option 622), or search for related audio assets (e.g., same artist, album, genre, etc.). A user may also be provided with selectable options to edit, add, delete (e.g., option 624), sort, rearrange, or otherwise modify the listings of audio asset list 612. In some embodiments, a user is provided with options to send, transfer, or share audio content or related information with another user (e.g., option 626). In turn, a user may be allowed to accept, reject, forward, store, or share audio content or related information from another user. The audio assets or related information may be transmitted between users through communications network 514 of FIG. 5, either directly, in peer-to-peer fashion, or through a server (e.g., media content source 516 or data collection server 517).

As described above, when the information to be displayed in a listing of audio asset list 612 cannot be displayed all at once, the listing may display only some of the information. A user may then select the listing to display additional information or to be presented with a selectable option to display additional information. This additional information may be displayed in an overlay over audio library display screen 600, on another display screen of the media guidance application, or the media guidance may access an external service to display additional information (e.g., an internet browser). In addition, or alternatively, the information within the listing may scroll, as in a marquee, to display additional information. Listings with additional information available may be indicated as such via a visually distinguishing display property such as shading, highlight, color, border, etc., or the listing may contain a textual indication, such as an ellipsis (i.e., " . . . "). In some embodiments, a clip of the audio asset, or the full audio asset, associated with a listing is played when a user navigates over, highlights, or selects a listing. The behavior of the media guide in response to a user highlight or selection of a listing may be configurable by the user. For example, the user may configure the media guidance application to scroll the information in a listing when the user navigates to the listing using a cursor or highlight, and to play the audio asset only upon selection of the listing. Although not shown in FIG. 6, the listings of audio asset list 612 may be categorized into distinct sections or categories, and may be sorted by identifying information (e.g., associated video program, title, artist, album, genre, etc.).

Audio library display screen 600 may include one or more advertisements (e.g., advertisements 616, and 618). The advertisements may be any suitable size or shape, and may be located anywhere within, or overlaid anywhere on top of, audio library display screen 600. For example, audio library display screen 600 may include advertisements within the listings of audio asset list 612 or in an overlay region over a portion of audio library display screen 600. In some embodiments, the media guidance application identifies a suitable advertisement based on a link between the advertisement and a particular display screen. For example, the media guide application may search an advertising database (e.g., advertising data store 410 of FIG. 4) for an advertisement with a link to audio library display screen 600. In addition to these concepts, features, functionalities, and parameters describing advertisements displayed in audio library display screen 600 (e.g., advertisements 616 and 618), the displayed advertisements may incorporate any of the concepts, features, functionalities, and parameters described above in connection with advertisement 124 of FIG. 1.

Advertisements 616 and 618 may advertise products, services, television programs, or other media which, in some cases, may be related to the listings displayed in audio asset list 612. Advertisements 616 and 618 may also be related to other media or to other advertisements displayed in the media guidance application. The displayed advertisements may also be related to user interaction with the media guidance application, user information stored in a user profile, or user data monitored and collected by the media guidance application. For example, listing 614 may be "Simpsons Theme" and advertisement 616 may advertise products or services related to The Simpsons, another show owned by FOX Broadcasting Company, other audio assets featured in The Simpsons, or any other suitable audio or video content. As another example, advertisement 616 may be linked to audio library display screen 600 in response to a user request for audio asset identification (e.g., a user request to identify "Simpsons Theme"). As yet another example, advertisement display region 618 may contain an advertisement for products or services related to the advertisement displayed in advertisement display region 616.

Advertisements 616 and 618 may be selectable and may provide further information about media content, provide information about a product or a service, enable purchasing of media content, a product, or a service, provide media content related to the advertisement, etc. For example, advertisement 616 may offer audio assets related to listing 614 (e.g., a song featured in The Simpsons). Selecting the advertisement may allow the user to purchase an advertised audio asset. Selecting or otherwise interacting with advertisement 616 may also allow the user to retrieve additional information about an advertised audio asset or to play an audio clip or sample of the advertised audio asset. Advertisement 618 may in turn be related to advertisement 616 and may, in some instances, advertise an audio asset attributed to the same artist as the audio asset featured in advertisement 616. The examples above illustrate only some of the many possible configurations in which the listings displayed in audio asset list 612 and the advertisements displayed in audio library display screen 600 may be related, linked, or responsive to each other. As another illustrative example, advertisements 616 and 618 may change in response to user interaction with the listings displayed in audio asset list 612. For instance, advertisements 616 and 618 may change or update in response to a user highlight or selection of a listing.

The media guidance application may implement any combination of the features described above in order to select advertisements 616 and 618. For example, the media guidance application may select advertisements 616 and 618 based on the currently highlighted listing together with the user's recent purchase history. As another example, the media guidance application may select advertisement 616 based on the currently highlighted listing and advertisement 618 based on the other listings of audio asset list 612. Any information indicative of media content, products, or services that the user may wish to access or purchase may be considered by the media guidance application in order to select appropriate advertisements.

The media guidance application may also receive or retrieve information from a server (e.g., data collection server 517 of FIG. 5) or other user equipment (e.g., user television equipment 502 of FIG. 5) that may be used to select advertisements 616 and 618. For example, the media guidance application may determine that a user prefers a certain genre of music, may query data collection server 517 of FIG. 5 for popular songs within that genre, and may display an advertisement for one or more of the popular songs. In addition, the media guidance application may search the listings of audio asset list 612 to ensure the advertisement features a song not already included in the list. Data collection server 517 of FIG. 5 may identify popular songs based on monitoring the audio libraries or purchasing habits of multiple users.

While audio library display screen 600 is illustrated as a full screen display, it may also be fully or partially overlaid over media content being displayed (e.g., a television program). In some embodiments, audio library display screen 600 is displayed in response to a user request to view audio assets associated with a particular video program. For example, with a program listing highlighted (e.g., program listing 108 of FIG. 1) or a video program displayed on the display screen, a user may request to view audio assets associated with the highlighted program listing or displayed video program, respectively. A user may indicate this request by pressing a dedicated button on a user input device or by selecting an option displayed on the display screen, for example, in an overlay over a portion of the displayed video program or media guidance application display screen. In these embodiments, audio library display screen 600 may be configured to display only those listings of audio assets that are associated with the particular video program (i.e., the video program associated with the highlighted program listing or the displayed video program at the time of the user request). In addition, advertisements 616 and 618 may be selected based, at least in part, on the particular video program. For example, upon receiving a user request to view audio assets associated with program listing 108 of FIG. 1 ("The Simpsons"), the media guidance application may display audio library display screen 600 with only listing 614 ("Simpsons Theme"), and other Simpsons related audio content, displayed in audio asset list 612.

Audio library display screen 600 may thus be configured to selectively display listings of audio assets depending on the context, mode, or method in which the user requests to view audio library display screen 600. As further examples, a user may select to view audio assets associated with any type of video program, such as a movie or an episode of a television program, or audio assets associated with a group of video programs, such as all movies recorded on the user's DVR or a complete television series, and the media guidance application may tailor audio library display screen 600 to display only those listings of audio assets that are associated with the video program or video programs of interest.

Figure 7:
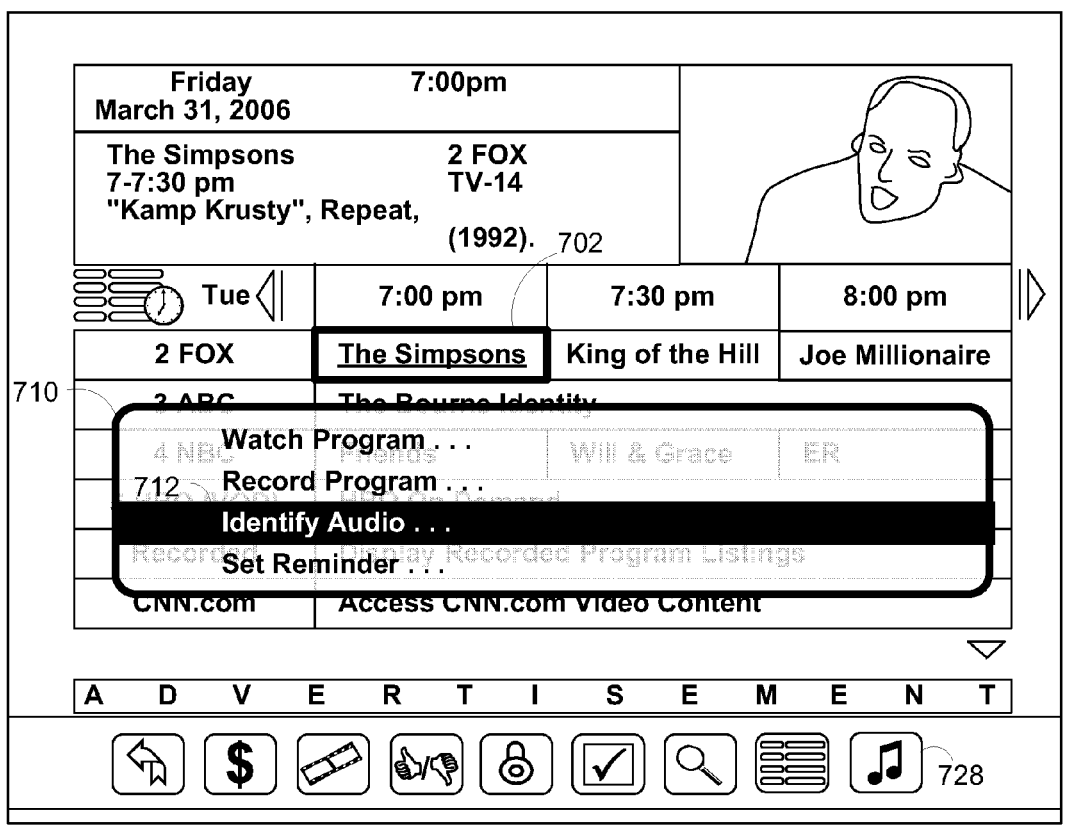
FIG. 7 shows a display screen of a media guidance application with an audio identify feature according to an illustrative embodiment of the invention.

Referring now to FIG. 7, illustrative overlay region 710 with an option to identify audio assets embedded within a video program is provided in accordance with an embodiment of the present invention. Although overlay region 710 is displayed over a portion of illustrative program listings display screen 700, it should be understood that overlay region 710 may be displayed in connection with, and over a portion of, any media guidance display screen with a listing associated with a video program or a plurality of video programs. In addition, overlay region 710 may be displayed in connection with, and over a portion of, a video program displayed on the display screen (i.e., display 312 of FIG. 3). Overlay region 710 may be displayed automatically, in response to a user press of a dedicated button on a user input device, or in response to a user selection of a displayed selectable option (e.g., selectable option 728). Illustrative program listings display screen 700 may be an instance of illustrative grid program listings display screen 100 of FIG. 1.

Overlay region 710 provides the user with option 712 to identify audio assets embedded within a video program. In some embodiments, selecting option 712 with a video program listing highlighted or activated configures the media guidance application to identify all audio assets within the video program. For example, selecting option 712 may configure the media guidance application to identify all songs featured in video program 702 ("The Simpsons"). In other embodiments, selecting option 712 displays options allowing the user to configure what type of audio assets are identified, how audio assets are identified, or what actions the media guidance should perform following audio asset identification. For example, options may be displayed allowing the user to configure the media guidance application to identify only songs, speeches, or other categories of audio content. As another example, options may be displayed allowing the user to configure the media guidance application to identify audio assets using metadata, audio analysis, or both, or another suitable identification method (such as querying a server for audio asset information). As yet another example, options may be displayed allowing the user to configure the media guidance application to save all or some of the audio asset information for later review or to automatically purchase, save, or download all or some of the identified audio assets. Options may also be displayed allowing the user to configure the media guidance application to limit recording, downloading, or purchasing of audio assets or audio asset information depending on pre-selected criteria. For example, a user may configure the media guidance application to automatically purchase or download only those songs identified in a video program that meet a pre-selected genre, artist, etc.

Audio asset identification may be performed using video program metadata, other stored data containing audio asset information, audio analysis, or by querying a server, as will be discussed in greater detail below in connection with FIG. 9. In circumstances in which audio assets or audio asset information associated with a video program is immediately available (e.g., audio asset information is stored in the video program's metadata or the audio asset was previously identified), the media guidance application may display the audio asset information to the user immediately in response to the user request for the audio asset information. In cases in which the audio asset information is not immediately available, the media guidance application may display the information as soon as it is retrieved, at the completion of the identification process, or the audio asset information may be stored for later retrieval.

In some embodiments, when overlay region 710 appears over a displayed video program, option 712 allows the user to identify the audio asset currently playing in the video program. This may be advantageous, for example, in a circumstance in which a user is watching a television program (or commercial) and wishes to identify a song currently playing.

In this scenario, a user need only press a button or select a displayed option to identify the audio asset. In other embodiments, when overlay region 710 appears over a displayed video program, option 712 provides the same features and functionality as described above in connection with program listing 702. For example, option 712 may allow the user to identify all of the audio assets embedded in the displayed video program.

Figure 8A:
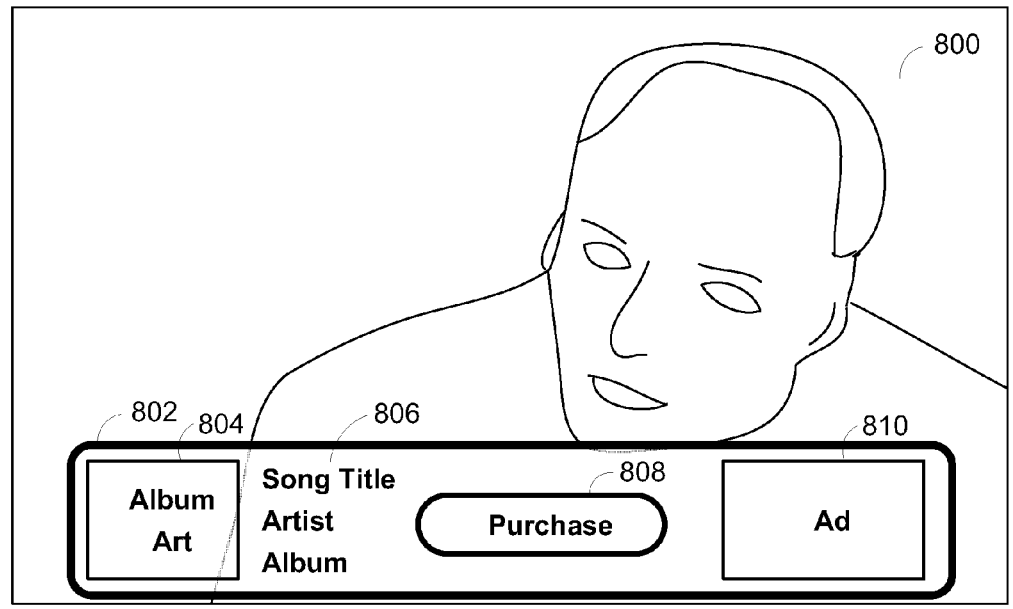
FIG. 8A shows a display screen with an overlay region including audio information and a purchase feature according to an illustrative embodiment of the invention.
Figure 8B:
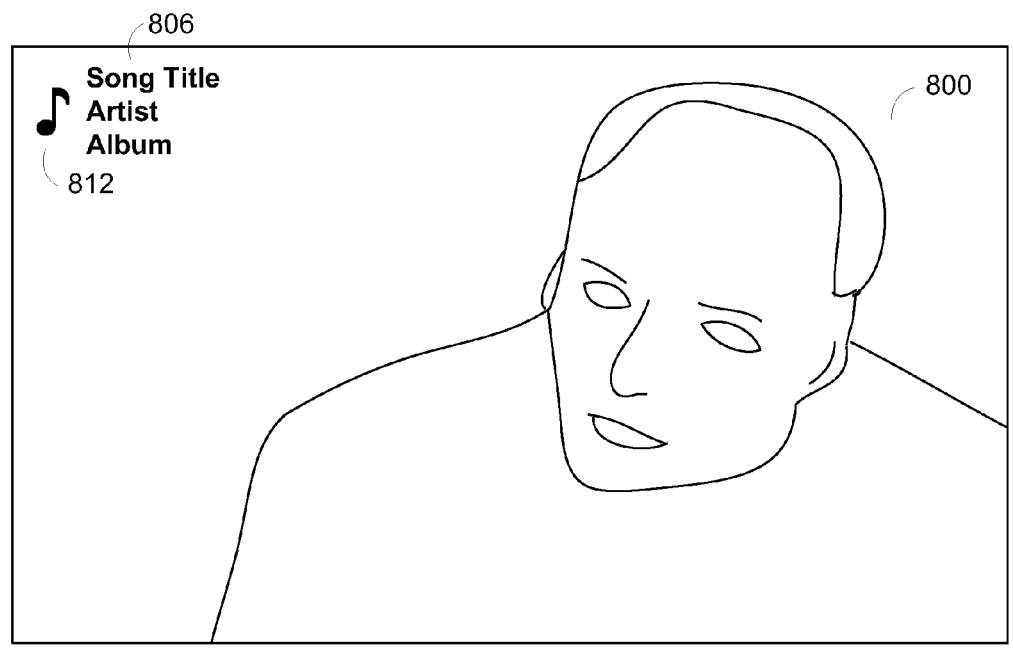
FIG. 8B shows a display screen with an alternate audio information and/or purchase feature according to an illustrative embodiment of the invention.

Referring now to FIGS. 8A and 8B, illustrative display screens of the media guidance application, in which a video program 800 is displayed along with audio asset information 806, are provided in accordance with an embodiment of the present invention. In particular, FIGS. 8A and 8B illustrate the display of audio asset information in response to a user request to identify an audio asset embedded within a displayed video program. Although the description of these display screens refers to audio assets embedded in a video program, it should be understood that the concepts, features, and techniques discussed herein may apply to audio assets embedded in any type of media content (e.g., an interactive advertisement, an audio program, or a game).

The display screens of FIGS. 8A and 8B include audio information display region 802. Display region 802 may be an overlay displayed over video program 800. Display region 802 may be displayed in response to a user request or selection, or it may be displayed automatically upon successful fulfillment of an audio asset identification request. For example, display region 802 may be displayed in response to a user press of a dedicated button on a user input device. As another example, display region 802 may be displayed in response to a user request to identify an audio asset currently playing in video program 800.

Audio information display region 802 may contain album art 804 and audio asset information 806 such as song title, artist, and album. This information may be retrieved from metadata associated with video program 800, local storage (e.g., audio data store 412 of FIG. 4), or from a remote location (e.g., sources 516, 517, or 518 of FIG. 5). Audio information display region 802 may also contain a purchase option 808 and advertisement 810. The elements displayed in display region 802 may differ from those shown depending on the type or category of the audio asset. For example, album art, song title, artist, and album are most applicable to an identified song. If, instead, the identified audio asset is a speech, display region 802 may display the speaker's name, the location of the speech, a logo of the sponsoring organization, etc. Similarly, purchase option 808 may only be displayed if the identified audio asset is available for purchase. Alternatively, or in addition, an option may be displayed to download, record, or save the identified audio asset or its associated audio asset information. Advertisement 810 may be related to the identified audio asset or the displayed video program 800. In addition, advertisement 810 may incorporate any of the concepts, features, functionalities, and parameters described above in connection with advertisements 616 and 618 of FIG. 6.

The contents of audio information display region 802 may be edited or modified. For example, the text of audio asset information 806 may be edited by the user and added to the video program's metadata, stored in local storage (e.g., audio data store 412 of FIG. 4), or transmitted to a remote server (e.g., data collection server 517 of FIG. 5). A user may edit the contents of display region 802, for example, in order to correct the displayed audio asset information. In addition, the contents of audio information display region 802, or audio information display region 802 itself, may be selectable and may allow the user to retrieve additional information or to purchase, record, or download the identified audio asset or its associated audio asset information.

As shown in FIG. 8B, audio asset information may be displayed directly over video program 800. In particular, any of the elements described above in connection with audio information display region 802 may overlay video program 800. For example, audio asset information 806 may be displayed directly over video program 800. In addition, a visual indicator 812 may indicate to the user that the displayed information is audio asset information. In some embodiments, album art 804 or advertisement 810 may be displayed instead of, or in addition to, visual indicator 812. The visual indicator or the displayed audio asset information may be selectable and may allow the user to retrieve additional information or to purchase, record, or download the identified audio asset or its associated audio asset information.

Figure 9:
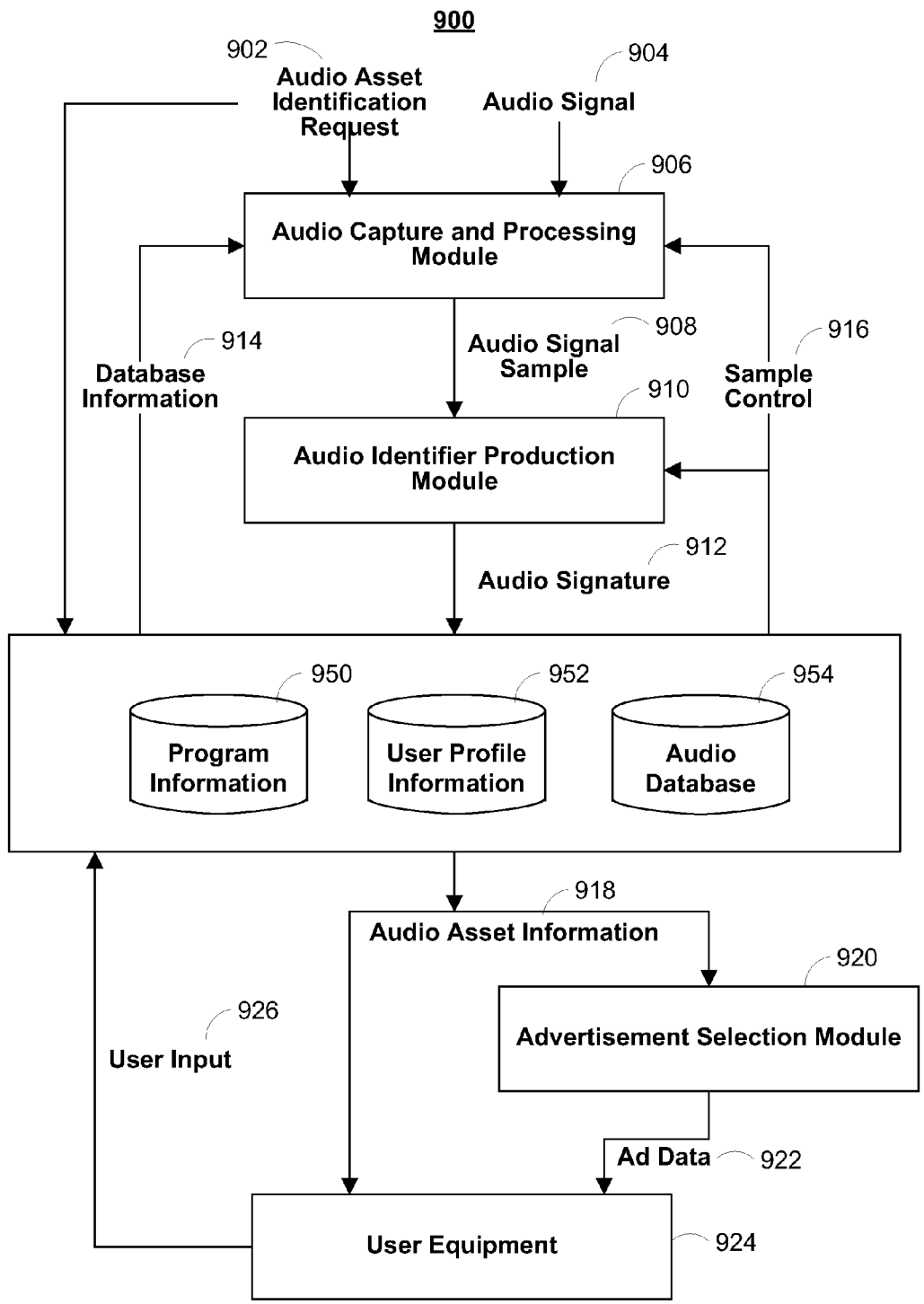
FIG. 9 shows a system for processing audio asset identification requests according to an illustrative embodiment of the invention.

Referring now to FIG. 9, illustrative system 900 is shown for processing audio asset identification requests in accordance with an embodiment of the present invention. In particular, system 900 illustrates a number of different ways in which audio asset information 918 may be provided to a user in response to an audio asset identification request 902. As will be described in more detail below, the various modules, devices, data stores, and signals of system 900 may be used individually or in combination in order to identify audio signals, provide audio asset information, or otherwise perform the functions discussed below.

System 900 may include an audio capture and processing module 906 for recording, or otherwise capturing, a portion of an audio signal 904. Audio signal 904 may represent an audio signal currently being provided to speakers 314 of FIG. 3, an audio signal embedded in a video program, an audio signal being input using user input interface 310 of FIG. 3, or any other audio signal provided, indicated, or selected (e.g., by the user or the media guidance application) for identification. Audio signal 904 may be in any format (e.g., a raw waveform or a binary file such as WAV, MP3, etc.), may be analog or digital, may include a single audio asset or multiple audio assets, and may be extracted from a video program, an audio program, or any other media content.

Audio capture and processing module 906 may initiate the capture of audio signal 904 in response to receiving an audio asset identification request 902. In some embodiments, audio asset identification request 902 triggers audio capture and processing module 906 to capture audio signal 904. In cases in which multiple audio signals are available, the audio capture and processing module 906 may be configured to default to a particular audio signal 904 or to access audio signal 904 from a default audio source. Alternatively, the media guidance application may determine which audio signal to provide to module 906. For example, the media guidance application may determine which audio signal to provide to module 906 based on the current display screen of the media guidance application (e.g., if a video program is being displayed, the audio signal embedded in the video program may be provided). As another example the media guidance application may determine which audio signal to provide to module 906 based on user interaction with the media guidance application (e.g., if a user selects a particular listing in audio library 612 of FIG. 6, the audio signal associated with the listing may be provided).

In other embodiments, audio asset identification request 902 includes additional information associated with the request, which may be provided to processing module 906 in order to assist in the capture and processing of audio signal 904. For example, audio asset identification request 902 may include information on the source of audio signal 904 (e.g., which audio source, video program, channel, or audio asset contains the audio signal), where in the source audio signal 904 is located (e.g., start time and end time), and what type of audio signal is being provided (e.g., audio format, audio quality, etc.).

Audio asset identification request 902 may also include information to assist audio capture and processing module 906 and audio signature production module 910 create, respectively, a suitable audio signal sample 908 and audio signature 912. In addition, audio asset identification request 902 may include information to facilitate the retrieval and storage of records in data stores 950, 952, and 954. For example, audio asset identification request 902 may indicate that the desired audio asset is a song. In response, audio capture and processing module 906 may use a sampling technique specifically customized for songs, or it may employ audio processing techniques that isolate songs from other audio content contained within the same audio signal. Audio signature production module 910 may likewise use a signature production technique particularly suited to producing a unique signature for songs, which may be different than, for instance, an audio signature produced for dialogue. Finally, an indication that the desired audio asset is a song may allow a search for a matching audio signature to be targeted to a particular section of audio database 954 that contains only audio signatures of songs.

A record of audio asset identification request 902 may be stored in a local or remote data store, such as user profile data store 952, or may be sent to a server for further processing, such as data collection server 517 of FIG. 5. The record may incorporate any information included in or associated with audio asset identification request 902. In addition, the record may include an indication that the audio asset identification process was initiated, a timestamp of the request, information about the audio signal provided for processing by module 906 (e.g., which audio signal was selected or the source of the audio), information on user interaction with the media guidance application (e.g., how the user initiated the request, what display element the user selected to initiate the request, etc.), information on the state of the media guidance application (e.g., what the media guidance application was displaying at the time of the request), or any other suitable information useful for characterizing audio asset identification request 902 or audio signal 904.

Audio capture and processing module 906 may process a portion of audio signal 904 in order to produce audio signal sample 908. Audio capture and processing module 906 may be located at user equipment or at a remote location. For example, module 906 may be part of processing circuitry 404 of FIG. 4. Audio capture and processing module 906 may be configured to detect an optimal location within audio signal 904 for capture or processing. For example, module 906 may detect a portion of audio signal 904 that has a low amount of interference (e.g., low signal noise or a minimal amount of audio content other than the desired type). Module 906 may also process audio signal 904 to reduce or remove detected interference. In one scenario, for instance, the user may initiate an audio asset identification request and may indicate, or it may be determined, that the desired audio asset is a song. In response, audio capture and processing module 906 may detect a location in audio signal 904 in which audio signal artifacts associated with songs are most prominent and those of other types of audio content, such as narration, are at a minimum. Module 906 may also process audio signal 904 to enhance the audio artifacts detected in the audio signal commonly associated with songs while reducing those determined to belong to other types of audio content. Module 906 may also process audio signal 904 to reduce or removal signal noise, such as jitter.

Audio capture and processing module 906 may be configured to capture a predetermined amount of audio signal 904. For example, module 906 may be configured to capture 5 seconds of audio. Alternatively, the amount of audio captured may be variable. For example, the amount of audio captured may depend on the type of audio asset desired (e.g., 5 seconds of audio may be captured for a song identification request while 10 seconds may be captured if the desired audio asset is narration). Similarly, the length of audio signal sample 908 may be predetermined or variable. The amount of audio captured or the length of audio signal sample 908 may also depend on sample control 916, as will be discussed in further detail below. Sample control 916 may increase the length of audio signal sample 908, for example, if the audio identification process fails (e.g., no audio assets are identified or multiple audio assets are identified).

Audio signal sample 908 may be extracted or produced from any portion of audio signal 904. In addition, audio signal sample 908 may be provided continuously or at discrete time intervals. For example, audio capture and processing module 906 may continuously process audio signal 904 to produce a continuously updated audio signal sample 908. Alternatively, audio capture and processing module 906 may only produce audio signal sample 908 upon request, at certain time intervals, or upon detecting a better portion of audio signal 904 from which to produce an audio sample (e.g., detecting a portion of audio signal 904 with lower interference than previously detected).

Audio signature production module 910 may produce audio signature 912 based on audio signal sample 908. Audio signature 912 may be any type of identifying digital information generated from an audio sample and representative of an audio asset, such as an acoustic fingerprint. For example, an audio signature may be a condensed summary of the audio artifacts present within audio signal sample 908. Audio signature 912 may additionally be a digital file, hash, key, waveform, or any other type of data object.

Audio signature production module 910 may be located at user equipment or at a remote location. For example, module 910 may be part of processing circuitry 404 of FIG. 4. Audio signature production module 910 may process audio signal sample 908 to produce audio signature 912 using any suitable technique. For example, audio signature production module 910 may include algorithms or processing circuitry to detect and calculate any combination of an audio sample's average zero crossing rate, estimated tempo, average frequency spectrum, spectral flatness, prominent tones, and bandwidth.

Audio signature 912 may be produced from any portion of audio signal sample 908. In some embodiments, more than one audio signature 912 is produced from audio signal sample 908. Audio signature 912 may be provided continuously or at discrete time intervals. For example, audio signature production module 910 may continuously process audio signal sample 908 to produce a continuously updated audio signature 912. Alternatively, audio signature production module 910 may produce audio signature 912 upon request, at certain time intervals, or upon detecting the availability of a new audio signal sample 908.

With continuing reference to FIG. 9, audio signature 912 may be used to identify a known audio asset within a data store, such as audio database 954. The identification may be achieved by comparing audio signature 912 with a plurality of known or previously created audio signatures associated with known audio assets. These known audio signatures may be stored in audio database 954, which may be located at user equipment or at a remote location (e.g., in source 516 or 517). Audio database 954 may be searched for known audio signatures that match generated audio signature 912. The search may cease upon detection of a first matching known audio signature. Alternatively, all known audio signatures may be searched to determine all matching known audio signatures. When no matching known audio signatures are located, a new (e.g., an additional or updated) audio signature 912 may be used in a repeat search of audio database 954 to find known audio signatures matching the new audio signature 912. When multiple matching known audio signatures associated with different audio assets are located, a new audio signature 912 may be used in a subsequent search of the multiple matching known audio signatures to narrow the matching results. New audio signatures may be used in this fashion until only one matching known audio signature remains. Alternatively, when multiple matching known audio signatures associated with different audio assets are located, the initial matching results may be discarded and a new audio signature 912 may be used in a repeat search of audio database 954 to find known audio signatures matching new audio signature 912.

In some embodiments, audio signature 912 is continuously or periodically updated, as described above, or generated in response to sample control signal 916. Sample control signal 916 may be generated, for example, when more or less than one matching known audio signature is located in audio database 954. Sample control signal 916 may cause audio capture and processing module 906 to produce an updated audio signal sample 908, which may then be provided to audio signature production module 910 to produce an updated audio signal 912. Alternatively, sample control signal 916 may cause audio signature production module 910 to produce an updated audio signal 912 from the existing audio signal sample 908. There may also be circumstances in which sample control signal 916 is generated, and/or another search performed, when only one matching known audio signature is located in audio database 954. For example, it may be determined that the matching known audio signature is associated with an audio asset other than the desired audio asset (e.g., based on a user input that the identified audio asset is not the one sought by the user). In embodiments in which more than one audio signature 912 is produced by audio signature production module 910, each audio signature can be used individually or in combination to determine matching known audio signatures.

Audio database 954 may contain information, or links to information, associated with the known audio signatures. For example, known audio assets, or links to known audio assets, associated with the known audio signatures may be stored in audio database 954. (Audio data store 412 of FIG. 4 may be implemented in system 900 as data store 954.) Audio database 954 may also include any of the information stored in audio data store 412 of FIG. 4. For example, audio database 954 may include audio identification information such as the audio type, format, title, artist, composer, producer, author, description, genre, category, album, cover art, production dates, ratings data, or other identifying information associated with the audio assets corresponding to the known audio signatures. Audio database 954 may also contain information related to media content (e.g., a television program), logo, advertiser, advertisement, product, or service with which the audio is associated, or any other suitable associated information. For example, for each known audio signature stored in audio database 954, the database may also contain a list of television programs that contain the audio asset associated with the known audio signature. As another example, for each known audio signature stored in audio database 954, the database may contain information on past or future broadcasts (e.g., times and channels) of the associated audio asset or of the video program containing the audio asset. This information could be used, for instance, to determine at what time and on which channel a given audio asset will be broadcast next.

Information related to the identification, selection, or purchasing of audio assets may also be stored in audio database 954. For example, if an audio asset was identified, selected, or purchased while watching a video program or while interacting with the media guidance application, details related to the relevant video program or media guidance application display screen, respectively, may be stored in audio database 954. Information related to the video program may include video type, format, genre, category, title, episode, series, channel, description, broadcast date and time, relative timing of the audio within the video, sponsor, etc. Audio database 954 may also include information related to the context and conditions under which the audio content was identified, purchased, stored, selected, provided, or otherwise added to audio database 954. For example, a timestamp may be stored indicating the date and time of a user request to identify, purchase, store, select, provide, or otherwise add an audio asset to audio database 954. As another example, in embodiments in which multiple users may access the media guidance application, an indication of the user that added the audio asset to audio database 954 may be stored.

Audio data store 954 may also (or alternatively) store indexes to locations in other local or remote storage systems where the above information may be found. Audio data store 954 may be preloaded with all or some of the above information. In addition, audio data store 954 may be periodically updated with new information, or new information may be retrieved from a remote location upon request, periodically, or when a new audio asset is added or identified. Information may also be provided in metadata transmitted with, or separately from, a video or audio program. For example, when audio database 954 is local to user equipment, it may be updated with new audio information when an audio asset is identified, selected, purchased, or otherwise provided to the media guidance application. This information may be downloaded from a remote data store or may be extracted from information (e.g., metadata) provided along with the audio asset, the audio signal that includes the audio asset, or the video program containing the audio asset.

Audio database 954, as shown, may represent more than one audio data store. For example, audio database 954 may represent both an audio data store at user equipment and an audio data store at a remote location (e.g., data collection server 517 or media guidance data source 518). Information contained in a remote audio database may be transferred to a local audio database, or vice-versa. Reference to searching or updating audio database 954 may refer to searching or updating a local data store, a remote data store, or both. In some embodiments, any search of audio database 945 begins with a search of the local data store and proceeds to the remote data store only if no results are located in the local data store. For example, a search of local audio database 954 may be performed in order to locate a known audio signature that matches generated audio signature 912. If no matching known audio signatures are found in local audio database 954, a search may be performed on one or more remote audio databases 954.

Aside from audio signature 912, other information may also be used in the search for known audio signatures that match generated audio signature 912. As described above, for example, an indication of the type of audio asset desired may be used to select a sub-plurality of all known audio signatures stored in audio database 954 for inclusion in the search. Alternatively, an indication of the type of audio asset desired may be used to eliminate certain matching known audio signatures after the search. In some embodiments, information contained in, or associated with, audio asset identification request 902 is used to facilitate the search. For example, audio asset identification request 902 may indicate the video program containing the desired audio asset. Audio database 954 may then be searched for known audio signatures matching generated audio signature 912, wherein the matching known audio signatures are also determined to be associated with the indicated video program (i.e., data store 954 contains an indication that the audio assets associated with the matching known audio signatures are contained in the indicated video program). Information within program information data store 950 may also be used in the search process. For example, upon receiving audio asset identification request 902, the media guidance application may search program information data store 950 for information pertaining to the video program currently being watched. This information may then be used in the search of audio database 954. Such information may include metadata associated with the video program (e.g., closed captioning data) that may be compared to the information stored in audio database 954. Similarly, information within user profile data store 950 may be used in the search process. For example, in circumstances in which a number of known audio signatures match generated audio signature 912, user profile information may be used to determine the audio asset most likely desired by the user. The user's most preferred genre, for instance, may be stored in, or determined from, user profile data store 952 (or data store 954 itself) and this genre information may be used to determine a likelihood of each matching known audio signature corresponding to the desired audio asset. It is contemplated that any combination of local or remote data stores (e.g., data stores 950, 952, and 954) may be used in the search for a known audio asset.

In some embodiments, the audio signal sample and audio signature production steps are skipped, and a desired audio asset is determined without the need for audio signature comparison. For example, an indication of the desired audio asset may be contained within video program metadata (streaming or stored in program information data store 950) and, in some cases, used directly to search audio database 954. Alternatively, the video program metadata may contain links or references to audio assets stored in audio database 954. In other embodiments, an audio asset may have previously been identified and data characterizing the identification request, including the resulting audio asset information 918, may have been stored in audio database 954. A new audio asset identification request 902 may then be compared with previous audio asset identification requests and, if request 902 is determined to correspond to one of the previous audio asset identification requests, audio asset information 918 can be provided without requiring another search of the known audio signatures stored in audio database 954.

Once a known audio signature or known audio asset is determined to correspond to the desired audio asset, audio asset information 918 may be provided. Audio asset information 918 may link to, reference, or contain any of the information stored in audio database 954. Audio asset information 918 may be provided to user equipment 924 for storage or display on display screen 406 of FIG. 4. For example, audio asset information 918 may be displayed as audio asset information 806 of FIGS. 8A and 8B. Audio asset information 918 may also be stored within any of the data stores 950, 952, and 954. For example, audio asset information 918 may be added to metadata associated with a video program (e.g., the video program containing audio signal 904), which may be stored in program information data store 950. As another example, audio asset information 918, including an indication of the audio asset's genre, may be stored in user profile data store 952.

Audio asset information 918 may also be provided to advertisement selection module 920, which may use the audio asset information to choose an advertisement or advertisement data 922 for display, for example, as advertisement 810 of FIG. 8A. Advertisement selection module 920 may provide advertisements, for example, that are related to the identified audio asset, the video program containing audio signal 904, or any other information contained in audio asset information 918. Although audio asset information 918 is shown as a single line, different audio asset information signals may be provided to user equipment 924 and advertisement selection module 920. For example, audio asset information provided to user equipment 924 may contain only song title, artist, and album information while advertisement selection module 920 may additionally receive genre, composer, and production date information. Advertisement selection module 920 may also interface with data stores 950, 952, or 954 to retrieve information useful to advertisement selection. For example, advertisement selection module 920 may use audio asset information 918, and may access user profile information 952, to determine another audio asset similar to or different than the audio assets the user has previously purchased or identified. Advertisement selection module may also perform any of the functions described above in connection with choosing advertisements for display in FIG. 6 (e.g., advertisements 616 and 618).

In some embodiments, audio asset information 918 provides information on multiple audio assets. This may occur, for example, when multiple known audio signatures match generated audio signature 912, or when multiple known audio assets are otherwise identified. The user may then be provided with an option to select the desired audio asset. For example, the media guidance application may allow the user to play a sample of each identified audio asset and to indicate which corresponds to the desired audio asset. The user's indication may be stored in (local/remote) audio database 954 such that any subsequent search of audio database 954 (e.g., by another user) may return only the selected audio asset, or may return multiple audio assets with an indication that the selected audio asset is most likely the correct result. In some embodiments, data collection server 517 of FIG. 5 collects multiple user selections and determines which of the multiple audio assets most likely match the desired audio asset based on the most prevalent user selections.

In some embodiments, the media guidance application allows a user to edit audio asset information 918. For example, a user may notice an error or inconsistency in the audio asset information provided. In addition, when no audio asset information 918 is provided, the user may be allowed to add audio asset information. Any of this edited or added audio asset information may be stored in data stores 950, 952, or 954 or sent to data collection server 517 of FIG. 5. For example, the edited or added audio asset information may be added to video program metadata. As another example, the edited or added audio asset information may be sent to data collection server 517 of FIG. 5 which may then distribute the information to additional users (e.g., upon determining that the edited or added audio asset information is indeed correct).

As previously mentioned, any of the modules and devices of system 900 may be located at or in user equipment (e.g., user equipment 502, 504, or 506 of FIG. 5) or may be located at a remote location, such as within a server (e.g., sources 516, 517, or 518 of FIG. 5). In addition, any of the signals of system 900 may be produced locally or remotely and transferred remotely or locally, respectively. For example, audio asset identification request 902 may be produced by user equipment and sent to a remote server that retrieves audio signal 904, produces audio signal sample 908 and audio signature 912, retrieves audio information 918 from audio database 954, and sends audio information 918 back to the requesting user equipment. As another example, audio asset identification request 902, audio signal sample 908, and audio signature 912 may all be produced by user equipment, and audio signature 912 may be sent to a remote server that retrieves audio information 918 from audio database 954 and sends it back to the user equipment.

User equipment 300 of FIG. 3, 400 of FIG. 4, or 502, 504, or 506 of FIG. 5, or any other type of user equipment suitable for displaying audio asset information, such as a music player, may be implemented in system 900 as user equipment 924. For simplicity, only one user equipment device is shown, although it should be understood that user equipment 924 may represent a number of different user equipment devices, each of which may belong to the same or different users. As described above in connection with FIG. 5, a user equipment device on which a media guidance application is implemented may function as a standalone device or may be part of a network of devices.

As part of the audio asset identification process, data collection server 517 of FIG. 5 may receive any of the signals produced in system 900. For example, data collection server 517 of FIG. 5 may receive audio asset identification request 902 or audio asset information 918. The data collection server may receive these signals from any number of users, for example, through communications network 514 of FIG. 5. The data collection server may correlate and analyze the signals to determine the most requested or identified audio assets. In turn, data collection server 517 of FIG. 5 may send audio asset information 918 corresponding to the most requested or identified audio assets to other users for display or storage (e.g., in a local audio database). In addition, data collection server 517 of FIG. 5 may maintain a list of "popular" audio assets based on the number of requests to identify or purchase the audio assets. For example, an audio asset may be determined to be popular when a certain threshold of requests are received. Data collection server 517 of FIG. 5 may also monitor when users request these popular audio assets (e.g., timing), in what context the popular audio assets are requested (e.g., what video program or display screen the user is viewing or interacting with), and the types of users initiating the requests (e.g., what common user profile elements—such as music taste—the users have in common). Data collection server 517 of FIG. 5 may use all or some of the above information to proactively provide, or "push," audio asset information 918 to users. For example, the above information may be used to determine which users should receive the audio asset information (e.g., users with certain user profile data), when they should receive it (e.g., before, during, or after a video program), and how they should receive it (e.g., displayed on the display screen, stored in an audio data store, or added to an audio library). For example, the data collection server may send audio asset information 918 to users viewing a video program containing a popular audio asset, and the audio asset information may be displayed (e.g., in overlay 802 of FIG. 8A) when the popular audio asset starts playing in the video program (e.g., when the audio asset is output to speakers 314 of FIG. 3).

It should be understood that each of the embodiments discussed above in connection with FIGS. 1-9 are merely illustrative, and any other suitable configuration may be contemplated. For example, referring back to FIG. 4, data stores 408, 410, and 412 may be located remotely from user equipment 400, and may be implemented instead in, for example, media guidance data source 518 of FIG. 5. In these embodiments, the advantages and functions of the media guidance application described above are utilized even when a client-server system is used. That is, audio asset information may be retrieved at a remote location and provided to the user equipment device from the remote source.

In accordance with the advantages and functions of the media guidance application described above, for example, a user may initiate an audio asset identification request using a personal computer connected to the Internet. A remote server may receive the request through a web site, and may display audio asset information to the user and/or store the audio asset information in an online user profile. These user profiles may be part of an online social network, such that users may view and/or share audio identification requests, retrieved audio asset information, and any other suitable information. Users may also be provided with the capability to recommend audio assets to other users.

A user may initiate an audio asset identification request using a web site to indicate a video program containing the audio asset. For example, the user may specify the time and date when the audio asset was broadcast, and the channel or video program containing the audio asset. A server may use this information to retrieve audio asset information using any of the processes described in connection with FIG. 9. For example, the server may use the time and channel information to identify the video program containing the audio asset and may sample the program's audio signal at the specified time. In some embodiments, the user can view other audio asset identification requests initiated using the web site, for example, by other users. In other embodiments, the user can view a list of the most requested (i.e., "popular") audio assets.

It will be appreciated that while the discussion of audio assets has focused on songs, the principles of audio asset identification may be applied to other types of audio content, such as background music, narration, sound effects, dialogue, etc. In addition, while the discussion of audio assets has focused on audio assets embedded within video programs, the principles of audio asset identification may be applied to audio assets embedded in other media content or to audio assets not embedded within other media content.

The following flow diagrams serve to illustrate processes involved in some embodiments of the present invention. Where appropriate, these processes may, for example, be implemented completely in the processing circuitry of a user equipment device (e.g., processing circuitry 404 of FIG. 4) or may be implemented at least partially in a media guidance source remote from the user equipment devices (e.g., media guidance source 518 of FIG. 5).

Figure 10:
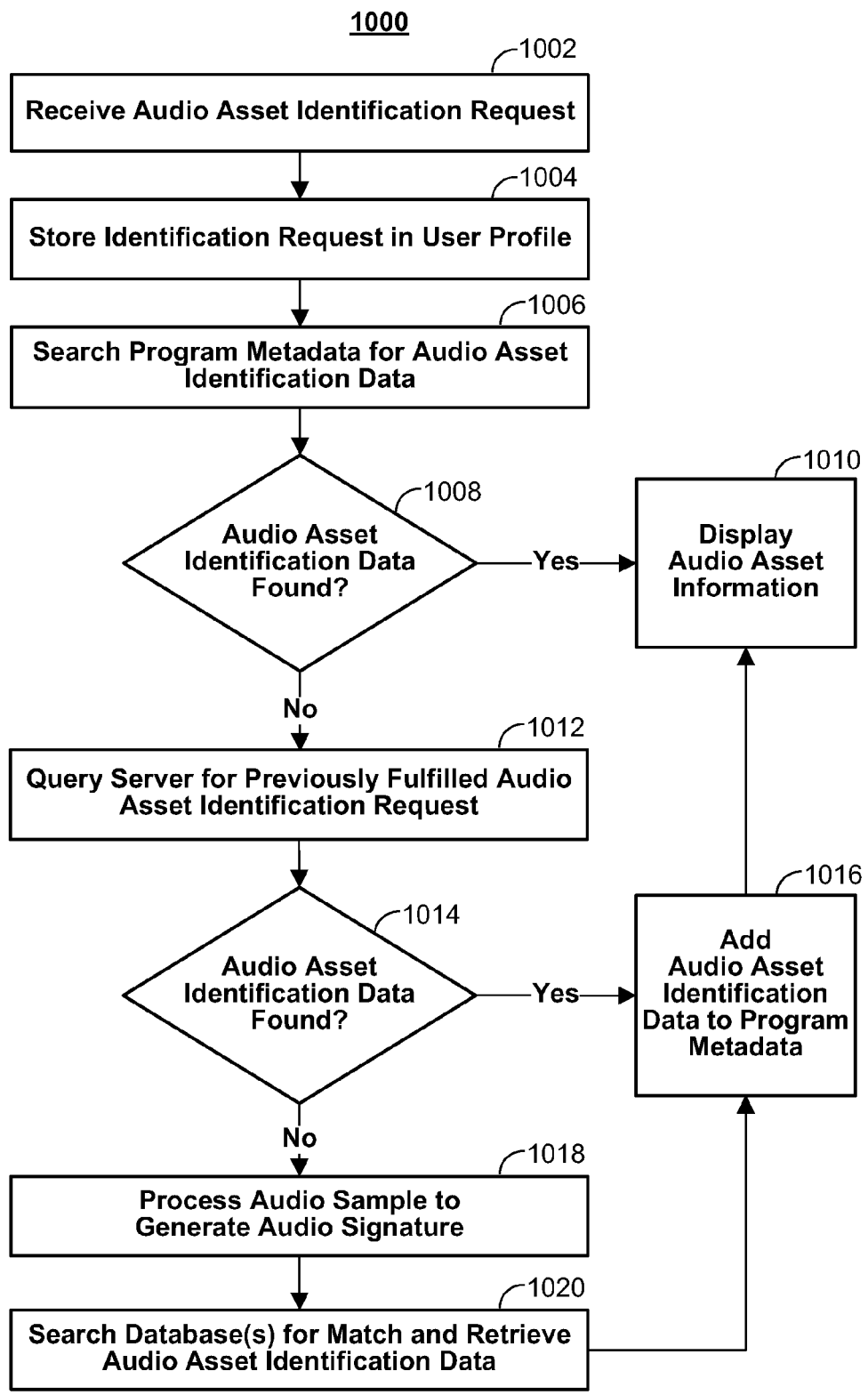
FIG. 10 shows a flow diagram of a method for processing audio asset identification requests according to an illustrative embodiment of the invention.

Referring now to FIG. 10, illustrative flow diagram 1000 is shown for processing an audio asset identification request using a media guidance application in accordance with an embodiment of the invention. At step 1002, an audio asset identification request (e.g. audio asset identification request 902 of FIG. 9) is received. A user may initiate an audio asset identification request by selecting a selectable option provided in a display screen (e.g., a menu option, a listings option, an icon, a hyperlink, etc.) or pressing a dedicated button on a remote control or other user input interface or device. For example, a user may select option 712 within overlay region 710 of FIG. 7 to initiate an identification request of an audio asset embedded within a video program. An audio asset identification request may also be initiated automatically by the media guidance application. For example, the user may have previously indicated a desire to identify certain types of audio assets (e.g., songs) in a particular video program or group of video programs (e.g., a television series or all viewed programs) and the media guidance application may automatically initiate audio asset identification requests accordingly. As another example, the media guidance application may continuously monitor video programs being viewed by a user and initiate audio asset identification requests periodically. As yet another example, the media guidance application may continuously monitor video programs being viewed by a user, predict when an audio asset currently playing in a video program may be of interest to the user, and initiate an audio asset identification request accordingly.

The media guidance application may utilize signal processing circuitry or specialized algorithms to detect the presence of audio assets or certain types of audio assets. For example, the media guidance application may utilize signal processing circuitry or specialized algorithms to continuously sample or process an audio signal, and to analyze the audio signal for audio or acoustic features particular to a given type of audio asset (e.g., a song may contain repetitive acoustic features, such as a beat). Alternatively, the media guidance application may analyze or search through metadata associated with a video program to detect or determine the types of audio assets contained within the video program. For example, closed captioning data may indicate the presence of an audio asset and the type of audio asset (e.g., the closed captioning data may include the word "song" or the phrase "music playing" or may include a music symbol such as "♪" or "♫"). As another example, the media guidance application may detect the presence of lyrics within the metadata. Upon detecting the presence of an audio asset, or a certain type of audio asset, using the methods above (or any other suitable method) individually or in combination, the media guidance application may initiate an audio asset identification request.

The media guidance application may predict when an audio asset currently playing in a video program may be of interest to the user based on the user profile. For example, the user profile may indicate that the user has a preference for audio assets contained in a particular video program or television series. As another example, the user may have initiated a number of previous requests to identify other audio assets while watching the same video program. As still another example, the user profile may indicate that the user has a preference for audio assets with certain types of audio features (e.g., a specific beat sequence or centered around a certain frequency range). The media guidance application may also predict when an audio asset currently playing in a video program may be of interest to the user using any other data store and using any other suitable method.

At step 1004, the audio asset identification request is stored in the user profile. As discussed in connection with audio asset identification request 902 of FIG. 9, the audio asset identification request may contain information ranging from a simple indication that a request was initiated, to a timestamp of the request, to detailed information about how and when the request was initiated (e.g., which video program or media guidance display screen was being viewed or indicated when the request was initiated). Additional information associated with the audio asset identification request 902 may also be stored. For example, an indication of which user initiated the request. As discussed in connection with user profile data store 952, the user profile may be stored locally, remotely, or both, and may be part of another data store. The information stored in the user profile may be monitored or analyzed to determine, among other things, the user's audio asset preferences. The information stored in the user profile may also be monitored or analyzed to provide the user with targeted advertisements. For example, based on the user's determined music tastes, an advertisement may be displayed for a song of similar, or different, taste. The media guidance application may also allow the user to request audio asset recommendations based on the user profile, or other suitable criteria.

At step 1006, the media guidance application may search metadata associated with an audio asset or a video program containing the audio asset for audio asset identification data. Audio asset identification data may include audio asset characterization information (e.g., title, artist, album, etc.), an identification number, an audio signature, or any other uniquely identifying audio asset information. Alternatively, audio asset identification data may include a reference or link to such information (e.g., information stored in audio database 954 of FIG. 9). The metadata may directly contain audio asset identification data, or it may include a reference or link to audio asset identification data. Alternatively, the metadata may include closed captioning data or lyrics that may, in turn, include audio asset identification data. Metadata may be provided along with a video program (separately or embedded in the video program), in the video blanking interval of a television broadcast, or using any other suitable technique (e.g., using the networks or other means discussed above in connection with FIG. 5). The metadata may also be received from any suitable source, such as a local or remote data store or server.

At step 1008, the media guidance application may determine whether audio asset identification data has been located in the metadata. If so, the process proceeds with step 1010, wherein the media guidance application displays audio asset information. The audio asset information may be the audio asset identification information contained within the metadata or linked to by the metadata. In addition, the audio asset information may include any of the information described above in connection with audio asset information 918 of FIG. 9. For example, in cases in which the audio asset is a song, the media guidance application may display the song title, artist, album, and album art (e.g., in overlay 802 of FIG. 8A).

If, in step 1008, the media guidance application determines that audio asset identification data has not been located in the metadata, the process may proceed to step 1012, wherein the media guidance application may query a server to determine if the audio asset identification request refers to the same audio asset as a previously fulfilled audio asset identification request. For example, the media guidance application may send timestamp and channel information associated with the request to a server (e.g., data collections server 517 of FIG. 5). The server may use the timestamp and channel information to identify the video program and the location of the desired audio asset within the video program. The server may then search previously received audio asset identification requests to determine whether any of the previous requests were associated with the desired audio asset. This determination could be made, for instance, based on the proximity of the previous and current requests or based on the timing of the previous and current requests relative to the same video program. If a previous audio asset identification request is found to correspond to the current request, the audio asset identification data associated with the previous request may be retrieved.

This audio asset identification data may have been associated with the previous request upon fulfillment of that request.

At step 1014, the media guidance application may determine whether audio asset identification data associated with a previously fulfilled audio asset identification request has been located. If so, the process proceeds with step 1016, wherein the media guidance application adds the audio asset identification data to metadata. For example, the audio asset identification data may be added to the metadata of the video program containing the identified audio asset. The metadata may include the location of the audio asset within the video program. After the metadata has been updated, the process may proceed to step 1010, wherein the media guidance application displays audio asset information, as discussed above.

If, in step 1014, the media guidance application determines that audio asset identification data has not been located in response to the query of step 1012, the process may proceed to step 1018, wherein the media guidance application may capture and process a portion of the audio signal targeted by the audio asset identification request to create an audio signature. For example, step 1018 may be performed by audio capture and processing module 906 and audio signature production module 910 of FIG. 9. The result of step 1018 may be audio signature 912 of FIG. 9, which is described in detail above in connection with FIG. 9.

At step 1020, the audio signature may be compared to a plurality of known audio signatures to identify a matching known audio signature associated with audio asset identification data. The comparison may be performed by searching an audio data store containing the known audio signatures, as described above in connection with FIG. 9 and audio database 954, and as will be described in greater detail below in connection with FIG. 11. Upon identifying a matching known audio signature in the audio data store, the media guidance application may retrieve the associated audio identification information, for example, from the same audio data store. The process may then proceed with step 1016, wherein the media guidance application adds the audio asset identification data to metadata, as discussed above. After the metadata has been updated, the process may proceed to step 1010, wherein the media guidance application displays audio asset information, as further discussed above.

Figure 11:
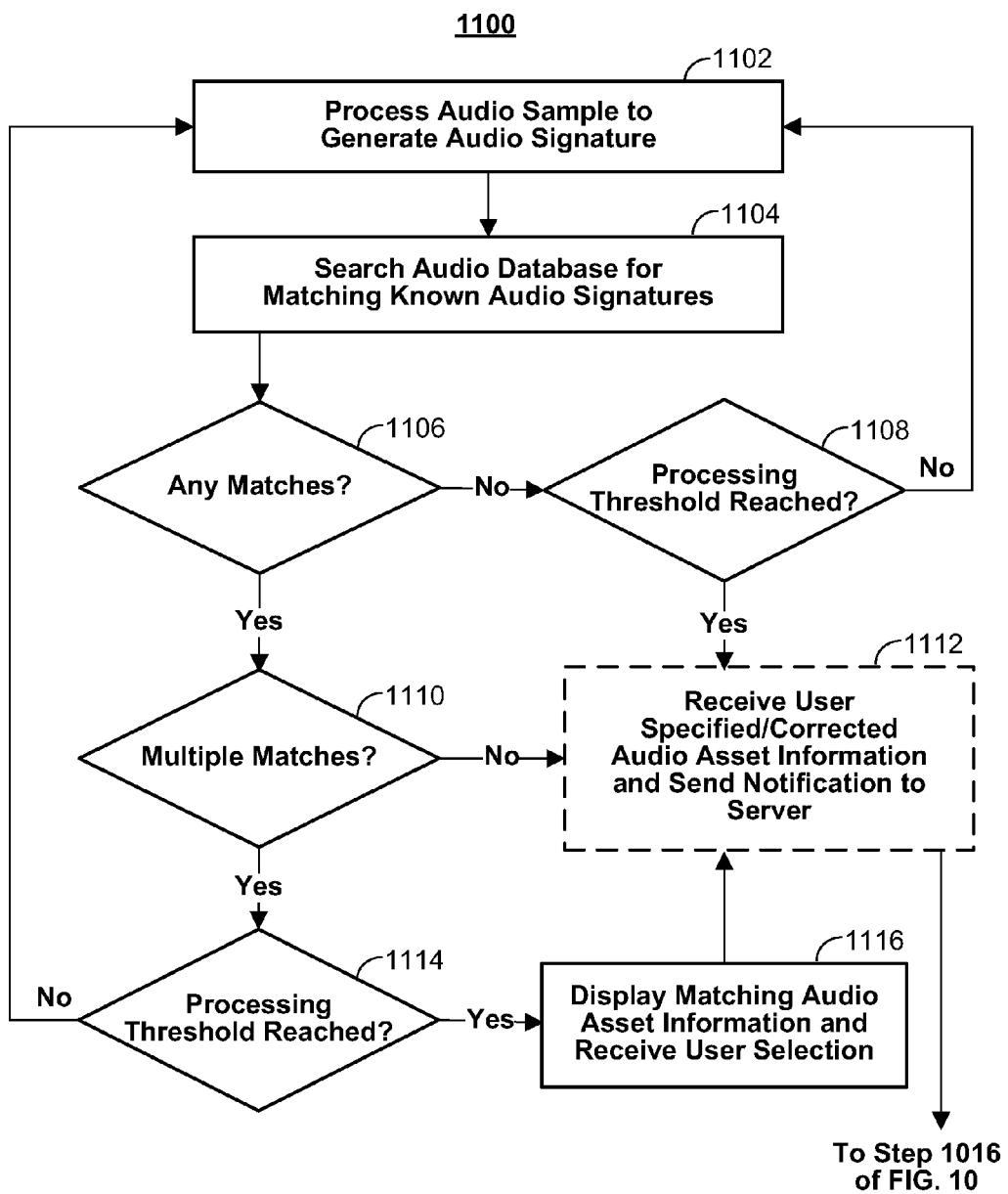
FIG. 11 shows a flow diagram of a method for processing an audio sample according to an illustrative embodiment of the invention.

Referring now to FIG. 11, illustrative flow diagram 1100 is shown for creating and utilizing an audio signature to search an audio database of known audio signatures in accordance with an embodiment of the invention. For example, illustrative flow diagram 1100 may show the detailed implementation of steps 1018 and 1020 of FIG. 10. At step 1102, the media guidance application may capture and process a portion of the audio signal targeted by the audio asset identification request to create an audio signature. For example, step 1102 may be performed by audio capture and processing module 906 and audio signature production module 910 of FIG. 9. The result of step 1102 may be audio signature 912 of FIG. 9, which is described in detail above in connection with FIG. 9.

At step 1104, the audio signature may be compared to a plurality of known audio signatures to identify a matching known audio signature associated with audio asset identification data. The comparison may be performed by searching an audio database containing the known audio signatures, as described above in connection with audio database 954 of FIG. 9. The audio database may be local to user equipment or located at a remote server. A plurality of known audio signatures may be pre-stored in the audio database, downloaded to the audio database at periodic time intervals, or transferred upon request. In addition, if an audio signature is generated in step 1102 that does not match any of the known audio signatures in the audio database, the generated audio signature may be added to the audio database and flagged to indicate missing audio asset identification data. This missing audio asset identification data may be provided by the requesting user (e.g., in step 1112), by another user (e.g., a system administrator at a remote server), or the system may automatically add the missing audio asset identification data at a later time (e.g., by associating the unknown audio signature with a known audio signature based on, for example, proximity of the audio asset identification requests that led to the generation of the audio signatures).

The generated audio signature may be compared to the known audio signatures using any suitable method, e.g., binary comparison, audio or signal correlation, acoustic feature recognition, etc. For example, two audio signatures may match if they contain the same or similar average zero crossing rate, estimated tempo, average frequency spectrum, spectral flatness, prominent tones, or bandwidth information. More than one matching known audio signature may be identified, or no matching audio signatures may be identified. In addition, one or more audio signatures may be generated and used to search the audio database for matching known audio signatures.

At step 1106, the media guidance application may determine whether the search of step 1104 resulted in the identification of matching known audio signatures. If no matches were found, the process may proceed with step 1108, wherein the media guidance application determines whether a threshold number of searches have been performed (the media guidance application may monitor the identification process and keep track of the number of database searches performed). If the threshold has been reached, the process may proceed to step 1112, which is described in greater detail below. Otherwise, if the threshold number of searches has not been reached, the process may return to step 1102 and another audio signature may be produced from the same or a different audio sample. This new audio signature may be used in another search at step 1104.

If it is determined in step 1106 that one or more matches were identified in step 1104, the process may proceed with step 1110, wherein the media guidance application determines whether multiple matched were found. If so, the process may proceed to step 1114, wherein the media guidance application may determine whether a threshold number of searches have been performed. This threshold may be the same or different than the threshold of step 1108. If the threshold has been reached, the process may proceed to step 1116, which is described in greater detail below. Otherwise, if the threshold number of searches has not been reached, the process may return to step 1102 and another audio signature may be produced from the same or a different audio sample. This new audio signature may be used in another search at step 1104. Alternatively, the new audio signature may be used to search only the previously identified multiple audio signatures, thus narrowing the matching results.

If the threshold of step 1114 has been reached, the process may proceed to step 1116. At step 1116, the media guidance application may display audio asset information associated with each of the multiple matching known audio signatures. The user may then be provided with an option to select the audio asset information associated with the desired audio asset. For example, the media guidance application may allow the user to play a sample of each identified audio asset and to indicate which corresponds to the desired audio asset.

If the media guidance application determines, in step 1110, that only one match was found as a result of the search of step 1104, the process may continue with step 1112. Step 1112 may also follow step 1116, and it may follow step 1108 if it is determined that the processing threshold in that step was reached. At step 1112, the media guidance application may allow a user to edit audio asset information associated with the matching known audio signature of step 1110 or the selected known audio signature of step 1116. The media guidance application may also allow a user to specify audio asset information for an audio signature that was not matched (e.g., when step 1112 is reached from step 1108). Any of the above mentioned selected, edited, or added audio asset information may be stored in the audio database or sent to a server (e.g., data collection server 517 of FIG. 5). The process may then continue with step 1016 of FIG. 10, wherein the audio asset information may be added to metadata associated with a media program containing the audio asset.

Figure 12:
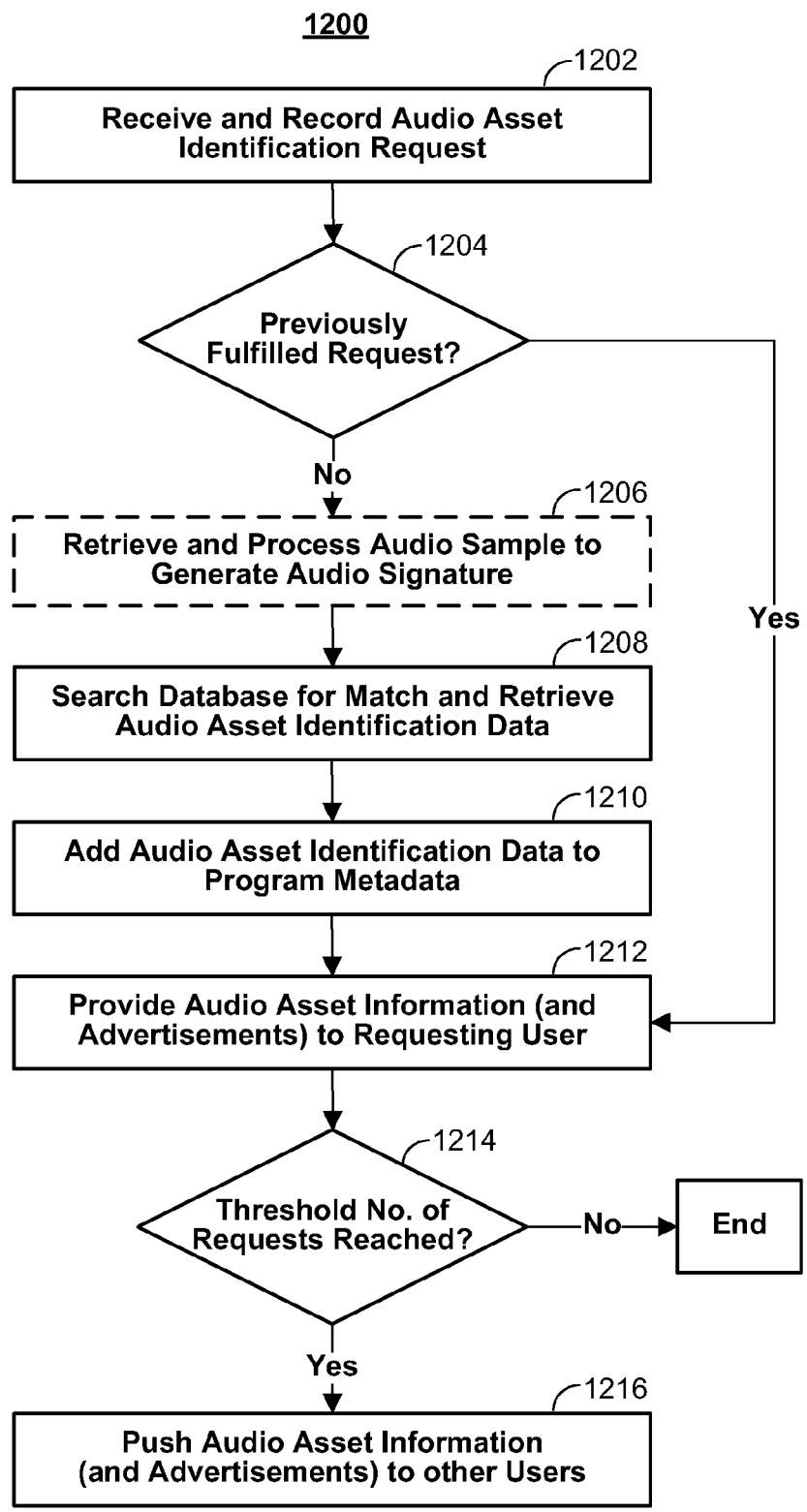
FIG. 12 shows a flow diagram of a method for processing audio asset identification requests using information from previously fulfilled audio asset identification requests according to an illustrative embodiment of the invention.

FIG. 12 shows a flow diagram 1200 for identifying and providing audio asset information according to an embodiment of the invention. First, the media guidance application receives and stores an audio asset identification request, as described above (Step 1202). Next, the media guidance application determines whether any previously received audio asset identification requests were directed to the same audio asset as the audio asset identification request received in step 1202 (Step 1204). If so, the audio asset information associated with such previously received audio asset identification requests is provided to the user (Step 1212). Previously received audio asset identification requests may be recorded at user equipment and/or at a remote server. Data collection server 517 of FIG. 5, for example, may record all audio asset identification requests transmitted by user equipment 502, 504, or 506 over communications network 514.

The media guidance application may determine that two audio asset identification requests are directed to the same desired audio asset using any suitable method. For example, the timing of the audio asset identification requests may be compared and, if received at approximately the same time, or within a certain time interval, may be assumed to refer to the same audio asset. Alternatively, the audio asset identification requests may be determined to refer to the same audio asset if the timing of the requests relative to the start of a video program is the same or in close proximity. For example, a first user watching a television program may initiate an audio asset identification request 488 seconds into the program. Using any of the methods mentioned above, audio asset information associated with the desired audio asset is retrieved and provided to the user. A second (or the same) user watching the same television program (at the same time or in the future) may initiate an audio asset identification request 490 seconds into the program. The media guidance application may determine, based on the similar timing of the requests, that the two audio asset identification requests are directed to the same desired audio asset. Accordingly, the second user may be provided with the audio asset information retrieved and provided to the first user. Two audio asset identification requests may also be determined to refer to the same audio asset based on audio analysis, metadata, or another suitable means for detecting that the same audio asset is playing when both requests are initiated.

If the media guidance application determines, at step 1204, that the audio asset identification request received at step 1202 does not align with a previously received request, then the media guidance application proceeds with creating an audio signature from an audio sample, as discussed in connection with steps 1018 and 1102 of FIGS. 10 and 11, respectively (Step 1206). Step 1206 may be performed immediately, or only after other methods of fulfilling the audio asset identification request are exhausted. For example, the media guidance application may first attempt to identify the desired audio asset using metadata.

The media guidance application then searches an audio database, or any other data store, for audio asset identification data, as described above in connection with audio database 954 of FIG. 9 and step 1104 of FIG. 11 (Step 1208). Next, audio asset identification data is added to video program metadata, as discussed in connection with step 1016 of FIG. 10 (Step 1210). Then, audio asset information and/or associated advertisements can be provided to the user, as described in connection with step 1010 of FIG. 10 (Step 1212).

A remote server (e.g., data collection server 517 of FIG. 5) may be employed to determine whether a threshold number of audio asset identification requests directed toward the same audio asset have been received (Step 1214). Each user may only be counted once in this tally, such that the remote server only counts unique audio asset identification requests. If the threshold has not been met, the process concludes. Otherwise, when the threshold number of requests for the same audio asset has been met or surpassed, an indication of the audio asset's popularity is determined and/or recorded and the process continues to the next phase.

At the next phase, audio asset information associated with popular audio assets may be pushed, or provided automatically, to other users (Step 1216). For example, a user viewing a video program containing a popular audio asset may receive audio asset information associated with the popular audio asset even without initiating an audio asset identification request. In it contemplated, for example, that a user watching a video program may be automatically presented with audio asset information as shown in FIGS. 8A and 8B when a popular audio asset begins playing. Popular audio assets may be determined for specific groups of users based on user profile information. For example, audio asset information associated with popular audio assets may be selectively provided to those users determined to likely be interested in such information. Alternatively, popular audio asset information may be provided to user equipment where it is stored and made available only upon user request. For example, popular audio asset information may be provided to user equipment in preparation for an audio asset identification request, thus obviating the need for a search or audio signature comparison.

Figure 13:
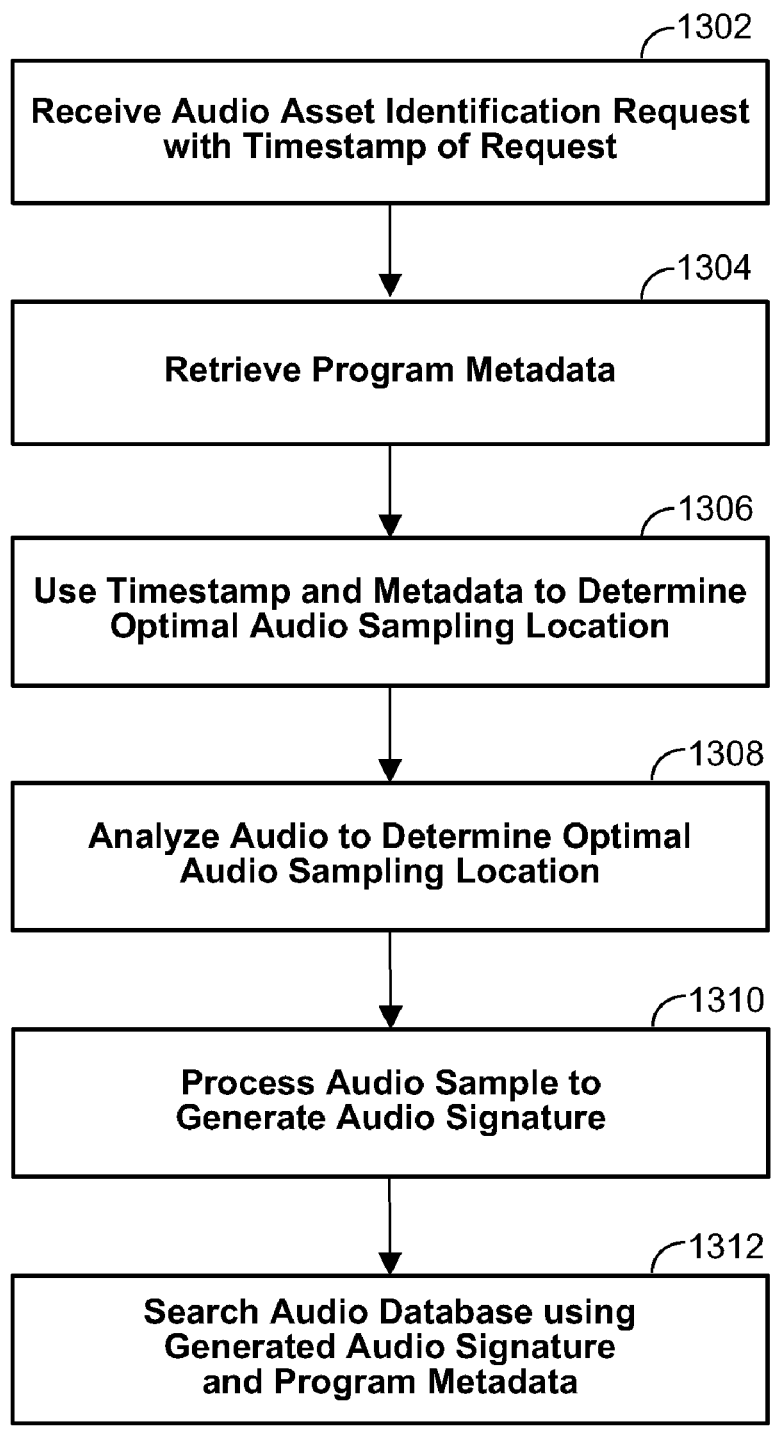
FIG. 13 shows a flow diagram of a method for processing audio asset identification requests by determining an optimal audio sampling location according to an illustrative embodiment of the invention.

Referring now to FIG. 13, illustrative flow diagram 1300 is shown for processing an audio asset identification request in accordance with an embodiment of the invention. At step 1302, the media guidance application may receive an audio asset identification request along with, or including, a timestamp of the request. At step 1304, the media guidance application may retrieve metadata associated with the video program containing the audio asset. The metadata may include, for example, closed captioning data.

At step 1306, the media guidance application may use the timestamp of the audio asset identification request to locate the portion of the audio signal containing the desired audio asset. The program metadata retrieved in step 1304 may then be used to assist the media guidance application in determining an optimal audio signal segment, near the located portion, from which to produce a sample. For example, closed captioning data may indicate when dialogue is present in a video program. If the desired audio asset type is dialogue or narration, the media guidance application may use the closed captioning data to ensure a sample is recorded when dialogue is present. Alternatively, if the desired audio asset type is a song or music, the media guidance application may use the closed captioning data to ensure a sample is recorded when dialogue is not present. As another example, if the metadata contains song lyrics, or closed captioning data indicating the onset and conclusion of music, the media guidance application may determine the duration of a song and may sample the audio signal anywhere in that duration. Similarly, the metadata may contain start time, end time, or play time of an audio asset, which may be used by the media guidance application to determine the boundaries limiting where the audio signal may be sampled.

At step 1308, the media guidance application may also analyze the audio signal before or after the identified location to determine an optimal segment of the audio signal from which to produce an audio sample. An optimal audio signal segment may be one in which interference or unwanted audio content (such as background noise) is at a minimum. Additionally, an optimal audio signal segment may feature easily detectable audio and acoustic features.

At step 1310, the media guidance application may produce a sample of the audio signal. A combination of the timestamp, metadata, and audio analysis may enable the media guidance application to sample the audio signal at the most ideal location. The audio sample is then used to generate an audio signature representative of the desired audio asset. At step 1312, the media guidance application may search an audio database for a known audio signature matching the generated audio signature, as described in connection with steps 1020, 1104, and 1208 of FIGS. 10, 11, and 12, respectively.

It should be understood that the steps of flow diagrams 1000, 1100, 1200, and 1300 are merely illustrative. Any of the steps of flow diagrams 1000, 1100, 1200, and 1300 may be modified, omitted, or rearranged, two or more of the steps may be combined, or any additional steps may be added, without departing from the scope of the present invention.

In various embodiments, in addition to the foregoing embodiments, the features described herein enable and include: (1) generating new audio signatures based on continual sampling of the audio asset in order to facilitate the database search, (2) allowing the user to select between multiple matching known audio assets, (3) allowing a user to identify audio assets without viewing the video program (e.g., selection of a listing, requesting to identify all songs in a series of programs, and so on), (4) allowing a user to instruct the guidance application to automatically identify audio assets, and (5) detecting the presence or location of audio using audio analysis or metadata.

For example, a media guidance application may be configured to compile a list of audio assets (e.g., songs) associated with a stored video program (or other media program, such as a music program) at user equipment. In some cases, the audio assets are embedded within the stored video program, while, in other cases, the audio assets are stored separately from the stored video program. The list of audio assets may be compiled by identifying the audio assets using any of the techniques described above. As one illustrative example, the media guidance application may sample each audio asset, create an audio signature corresponding to each audio asset, and provide the audio signatures to a remote server (e.g., to a web server accessible via the Internet). The remote server may then provide audio asset information to the requesting user equipment by comparing the received audio signatures with a database of known audio signatures. The media guidance application may, in turn, store and display the received audio asset information to the user. The media guidance may add all or a portion of the audio asset information to metadata associated with the stored video program. In addition, the media guidance application may add metadata indicating the start time, play time, and/or end time of each audio asset within the stored video program. Furthermore, in response to a user indication to play audio assets in the stored video program, the media guidance application may be configured to identify and play the audio assets. Identifying and playing audio assets may include identifying the storage locations of the audio assets or identifying the location of the audio assets within the stored video program (e.g., using the start/play/end time metadata). The media guidance application may also be configured to allow the user to select one or more audio assets from the list of audio assets, and to play, download, or record the selected audio assets. In this way, the media guidance application provides a user with quick and seamless access to a list of audio assets associated with a stored video program at the user equipment, and enables the user to retrieve the audio assets as desired.

In one exemplary arrangement, a plurality of user equipment, each including a DVR or like storage component, stores music data separately from video data by using digital encoding technology. Each user equipment is configured to find and identify music data within stored media programs (e.g., television programs) by using a media recognition mechanism, such as described above. Also, many media programs (e.g. dramas, music programs, television programs, etc.) may have embedded music. Currently, the creation of music metadata requires a huge amount of human resources. Advantageously, media guidance applications running on user equipment have enough processing power to identify and create music data locally and automatically from stored media programs. The media guidance applications can use network (e.g., Internet) connections to access a remote database of audio and/or other media assets. As a result, a media guidance application implemented on, for example, user equipment including a DVR or other data storage component, can show a music list of audio assets associated with each media program and can play back one or more audio assets from the media programs. In a further arrangement, the media guidance application can provide one or more audio assets via a music download service and/or CD Rental/Shipping service.

It will be apparent to those of ordinary skill in the art that methods involved in the present invention may be embodied in a computer program product that includes a computer usable and/or readable medium. For example, such a computer usable medium may consist of a read only memory device, such as a CD-ROM disk or conventional ROM devices, or a random access memory, such as a hard drive device or a computer diskette, having a computer readable program code stored thereon.

In addition to the foregoing, in one approach, a media guidance system includes a data store containing audio asset information associated with a set of known audio assets. The system also includes user equipment capable of i) receiving a video program including one or more audio assets, ii) displaying the video program, iii) displaying a user interface, and iv) receiving a user input using the user interface. The system uses a processor capable of i) receiving a user input including a request to identify an audio asset playing within the video program, ii) identifying the audio asset by processing data associated with the audio asset and data within the data store, and iii) providing audio asset information associated with the identified audio asset to the user interface for display.

In one embodiment, the data store includes a plurality of known audio signatures, where each known audio signature is associated with a known audio asset. The processing may include generating an audio asset signature, and identifying the audio asset may include comparing the generated audio asset signature with the set or plurality of known audio signatures in the data store. The system identifies the audio asset by identifying a match between the generated audio asset signature and one of the plurality of known audio signatures.

The generation of an audio asset signature may include processing a sample of the audio asset to calculate average zero crossing rate, estimated tempo, average frequency spectrum, spectral flatness, prominent tones, and/or bandwidth. The generation of the audio asset signature may also include determining an optimal segment of the audio asset to sample. In one embodiment, determining the optimal segment may include determining where interference, from audio data not related to the audio asset, is minimized. For example, the process of determining when interference is minimized may include analyzing the audio asset for audio or acoustic features indicative of audio data not related to the audio asset. As another example, the process of determining when interference is minimized may include analyzing metadata associated with the video program to determine when audio data not related to the audio asset is present.

In another embodiment, the processor generates metadata including at least a portion of the audio asset information associated with the identified audio asset. The audio asset information may include an audio title, artist, album, album art, genre, type, audio asset location in video program, play time of audio asset in video program, start time of audio asset, end time of audio asset, audio text, lyrics, and/or audio quality.

The identification of the audio asset may include processing metadata associated with the audio asset to extract audio asset information. The metadata may include song lyrics, closed captioning data, and/or text associated with the audio asset. In one approach, the processor compares metadata associated with the audio asset to the audio asset information associated with the set of known audio assets to identify the audio asset.

In certain configurations, the user equipment includes the processor and/or the data store. In other configurations, a media source includes the processor and/or the data store.

In one approach, the request to identify an audio asset is a first request and the processor is configured to: i) store the audio asset information associated with the identified audio asset, ii) receive a second request to identify the audio asset, iii) compare the first and second requests to determine that the first and second requests refer to the same audio asset, and iv) provide the stored audio asset information in response to the second request.

In another approach, the processor receives multiple requests to identify the audio asset, while the processor is configured to: i) store an indication of each request, ii) determine that a threshold number of requests has been received, iii) identify a second user viewing the video program who has not requested to identify the audio asset, and iv) automatically provide the audio asset information to the second user when the audio asset is playing.

In one embodiment, the audio asset information is overlaid on top of the video program. The audio asset information may be selectable and the user may be presented with an option to purchase the identified audio asset in response to the selection. In a further embodiment, the processor is configured to: i) select an advertisement based at least in part on the audio asset information, and ii) display the advertisement to the user.

The audio asset may include a song, dialogue, narration, sound effect, and/or background music. The processor may be configured to detect the start time and end time of the audio asset within the video program and/or add metadata to the video program including the start time and the end time. The processor may also be configured to receive a second user request to play all audio assets in the video program and/or play the audio assets based on the start time and end time metadata.

In another approach, a media guidance system includes a remote data source that receives audio asset information associated with a set of known audio assets. The system also includes a remote data store that stores the known audio assets and the audio asset information.

The system further includes a processor capable of: i) monitoring a user equipment data store, ii) identifying audio asset information stored in the remote data store that is not stored in the user equipment data store, and iii) providing the identified audio asset information to the user equipment data store.

In one embodiment, the identified audio asset information is provided in response to a user request to identify an audio asset playing within a video program.

The audio asset information may include an audio asset signature, title, artist, album, album art, genre, type, audio asset location in video program, play time of audio asset in video program, start time of audio asset, end time of audio asset, song lyrics, audio text, and/or audio quality data.

In another approach, a media guidance system includes a data store containing audio asset information associated with a set of known audio assets. The media guidance system also includes a processor capable of i) receiving a number of requests to identify an audio asset embedded within a video program from a first group of users, ii) storing an indication of the requested audio asset within the data store, and iii) providing audio asset information associated with the requested audio asset to a second group of users.

In one embodiment, the requested audio asset is identified by processing data associated with the requested audio asset and data within the data store. The data store may include a set of known audio signatures, where each known audio signature is associated with one of the audio assets in the set of known audio assets. In addition, each of the requests to identify an audio asset may include a generated audio asset signature. In turn, identifying the requested audio asset may include comparing the generated audio asset signatures to the set of known audio signatures in the data store to determine a matching known audio signature.

In another embodiment, identifying the requested audio asset may include processing metadata associated with the audio asset to extract audio asset information. The data associated with the requested audio asset may include song lyrics.

Audio asset information may be provided in response to receiving requests to identify the audio asset embedded within the video program from the second group of users. Alternatively, the audio asset information may be provided in response to determining that the second group of users have requested to view or record the video program, are currently viewing or recording the video program, or have viewed or recorded the video program in the past. As another alternative, the audio asset information may be provided in response to determining that user profile information associated with each of the second group of users matches user profile information associated with each of the first group of users. As still another alternative, the audio asset information may be provided in response to determining that the number of users within the first group of users matches or exceeds a predetermined threshold number of users for determining popularity.

The audio asset information may include an audio asset signature, title, artist, album, album art, genre, type, audio asset location in video program, play time of audio asset in video program, start time of audio asset, end time of audio asset, song lyrics, audio text, and/or audio quality data. In one embodiment, the media guidance system is capable of i) generating metadata including at least a portion of the audio asset information, and ii) associating the metadata with the video program.

In one embodiment, the aforementioned data store is located remotely from user equipment, and the media guidance system is capable of i) monitoring a set of user equipment data stores, ii) identifying audio asset information stored in the remote data store that is not stored in the set of user equipment data stores, and iii) providing the identified audio asset information to the set of user equipment data stores.

In another embodiment, the media guidance system is capable of i) selecting an advertisement based at least in part on the audio asset information associated with the requested audio asset, and ii) providing the advertisement to the first and/or second sets of users. The audio asset may be or include a song, dialogue, narration, sound effect, and/or background music.

It will be understood that the foregoing is only illustrative of the principles of the invention, and that various modifications may be made by those skilled in the art without departing from the scope and spirit of the invention. Those skilled in the art will appreciate that the present invention may be practiced by other than the described embodiments, which are presented for purposes of illustration and not of limitation, and the present invention is limited only by the claims that follow.

What is claimed is:

1. An audio asset information storage system comprising:
    a data store configured to store audio asset information associated with a known audio asset, wherein the audio asset information includes video program information associated with a video program that embeds the known audio asset, and
    a processor configured to: i) receive a plurality of requests to identify the known audio asset, ii) store an indication of each request within the data store, iii) provide at least a portion of the audio asset information associated with the known audio asset to user equipment, iv) receive a request to view all audio assets associated with a selected video program, v) search the data store for audio assets associated with video program information identifying the selected video program, and vi) provide at least a portion of the audio asset information associated with each of the matching audio assets to the user equipment.

2. The system of claim 1, wherein the audio asset information includes at least one of an audio asset signature, identifier, title, artist, album, album art, genre, type, lyrics, and play time.

3. The system of claim 1, wherein the video program information includes at least one of a program title, genre, type, episode, series, broadcast schedule, audio asset location, audio asset start time, audio asset end time, song lyrics, audio text, and audio asset quality.

4. The system of claim 1, wherein the data store is a remote data store, and wherein the processor is further configured to i) monitor a plurality of user equipment data stores, ii) identify audio asset information stored in the remote data store that is not stored in the plurality of user equipment data stores, and iii) provide the identified audio asset information to the plurality of user equipment data stores.

5. The system of claim 1, wherein at least a portion of the audio asset information is provided in response to determining that the user equipment is set to display or record the video program that embeds the known audio asset.

6. The system of claim 1, wherein at least a portion of the audio asset information is provided in response to determining that a user profile at the user equipment includes audio preference data matching characteristics of the known audio asset, wherein the characteristics are included in the audio asset information.

7. The system of claim 1, wherein at least a portion of the audio asset information is provided in response to determining that a user profile at the user equipment includes video preference data matching characteristics of the video program that embeds the known audio asset, wherein the characteristics are included in the video program information.

8. The system of claim 1, wherein the processor is further configured to i) determine that a threshold number of requests to identify the known audio asset have been received, and ii) store an indication of the threshold determination within the audio asset information associated with the known audio asset.

9. The system of claim 8, wherein at least a portion of the audio asset information is provided in response to the threshold determination.

10. A method for providing audio asset information comprising:
    storing audio asset information associated with a known audio asset in a data store, wherein the audio asset information includes video program information associated with a video program that embeds the known audio asset,
    receiving a plurality of requests to identify the known audio asset,
    storing an indication of each request within the data store,
    providing at least a portion of the audio asset information associated with the known audio asset to user equipment,
    receiving a request to view all audio assets associated with a selected video program,
    searching the data store for audio assets associated with video program information identifying the selected video program, and
    providing at least a portion of the audio asset information associated with each of the matching audio assets to the user equipment.

11. The method of claim 10, wherein the audio asset information includes at least one of an audio asset signature, identifier, title, artist, album, album art, genre, type, lyrics, and play time.

12. The method of claim 10, wherein the video program information includes at least one of a program title, genre, type, episode, series, broadcast schedule, audio asset location, audio asset start time, audio asset end time, song lyrics, audio text, and audio asset quality.

13. The method of claim 10, wherein the data store is a remote data store, the method further comprising:
    monitoring a plurality of user equipment data stores,
    identifying audio asset information stored in the remote data store that is not stored in the plurality of user equipment data stores, and
    providing the identified audio asset information to the plurality of user equipment data stores.

14. The method of claim 10, wherein at least a portion of the audio asset information is provided in response to determining that the user equipment is set to display or record the video program that embeds the known audio asset.

15. The method of claim 10, wherein at least a portion of the audio asset information is provided in response to determining that a user profile at the user equipment includes audio preference data matching characteristics of the known audio asset, wherein the characteristics are included in the audio asset information.

16. The method of claim 10, wherein at least a portion of the audio asset information is provided in response to determining that a user profile at the user equipment includes video preference data matching characteristics of the video program that embeds the known audio asset, wherein the characteristics are included in the video program information.

17. The method of claim 10 further comprising:
determining that a threshold number of requests to identify the known audio asset have been received, and
storing an indication of the threshold determination within the audio asset information associated with the known audio asset.

18. The method of claim 10, wherein at least a portion of the audio asset information is provided in response to the threshold determination.

* * * * *